US011755192B1

(12) United States Patent
Thomas et al.

(10) Patent No.: US 11,755,192 B1
(45) Date of Patent: Sep. 12, 2023

(54) METHODS AND SYSTEMS FOR INITIATING A RECORDING SESSION IN A GRAPHICAL USER INTERFACE BY DRAGGING A DRAG-TO-RECORD ELEMENT

(71) Applicant: Loom, Inc., San Francisco, CA (US)

(72) Inventors: Joseph J. Thomas, Atlanta, GA (US); Paulius Dragunas, Mill Valley, CA (US); Jandres Opao, Toronto (CA)

(73) Assignee: Loom, Inc., San Francisco, CA (US)

( * ) Notice: Subject to any disclaimer, the term of this patent is extended or adjusted under 35 U.S.C. 154(b) by 0 days.

(21) Appl. No.: 17/958,403

(22) Filed: Oct. 2, 2022

Related U.S. Application Data

(60) Provisional application No. 63/358,236, filed on Jul. 5, 2022.

(51) Int. Cl.
  *G06F 3/048* (2013.01)
  *G06F 3/0486* (2013.01)

(52) U.S. Cl.
  CPC .................. *G06F 3/0486* (2013.01)

(58) Field of Classification Search
  CPC ..................................................... G06F 3/0486
  See application file for complete search history.

(56) References Cited

U.S. PATENT DOCUMENTS

| | | | | |
|---|---|---|---|---|
| 6,572,660 | B1 * | 6/2003 | Okamoto | G06F 16/94 |
| | | | | 715/272 |
| 9,977,580 | B2 | 5/2018 | Stokman et al. | |
| 2002/0001000 | A1 * | 1/2002 | Shpilberg | G06F 3/0481 |
| | | | | 715/804 |
| 2006/0161856 | A1 * | 7/2006 | Heir | G06F 9/451 |
| | | | | 715/769 |
| 2008/0307308 | A1 * | 12/2008 | Sullivan | G06F 16/9577 |
| | | | | 707/E17.121 |
| 2009/0313304 | A1 * | 12/2009 | Goodger | G06F 16/986 |
| 2013/0328902 | A1 * | 12/2013 | Grant | G06F 3/048 |
| | | | | 345/589 |

(Continued)

FOREIGN PATENT DOCUMENTS

| | | |
|---|---|---|
| CN | 107957836 B | 12/2020 |
| CN | 113010073 A | 6/2021 |

OTHER PUBLICATIONS

Desktop Recorder, "Apex Screen Recorder & Screenshot Master", pp. 1-3. Available at: https://microsoftedge.microsoft.com/addons/detail/apex-screen-recorder-sc/poeeigch-hknedpbigbidjkimlkjnlmhb.

*Primary Examiner* — Aleksey Olshannikov
(74) *Attorney, Agent, or Firm* — American Patent Agency PC; Daniar Hussain; Stephen M. Hou

(57) ABSTRACT

Systems and methods for recording a GUI element (e.g., a window) on a user device through a single drag-to-record action are disclosed. The method includes rendering a drag-to-record element on a display of the user device and further receiving and storing one or more parameters of the GUI element, where the threshold edges of the GUI element are determined based on the one or more parameters of the GUI element. The method further includes receiving a drop position of the drag-to-record element that is above the GUI element, thus bounded by one or more threshold edges of the GUI element. The method further includes identifying the GUI element as a recording target based on the drop position of the drag-to-record element, and starting the recording of the GUI element.

30 Claims, 16 Drawing Sheets

(56) References Cited

U.S. PATENT DOCUMENTS

2015/0242104 A1* 8/2015 Stokman .............. G11B 27/031
            707/706
2018/0356960 A1  12/2018 Nix
2018/0373679 A1* 12/2018 Ranjan ................. G06F 40/103
2022/0206645 A1   6/2022 Zadina et al.

* cited by examiner

METHODS AND SYSTEMS FOR INITIATING A RECORDING SESSION IN A GRAPHICAL USER INTERFACE BY DRAGGING A DRAG-TO-RECORD ELEMENT

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

In addition, this application is related to U.S. Pat. No. 9,641,566, filed on Nov. 30, 2016, and entitled "Methods and Systems for Instantaneous Asynchronous Media Sharing," and to U.S. Pat. No. 11,289,127, filed on Nov. 13, 2021, and entitled "Instant Video Editing and Associated Methods and Systems," the entire disclosures of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the invention are in the field of digital technologies for screen recording, and, in particular, relate to a system and method for recording a Graphical User Interface (GUI) element, such as a window or a screen, on a user device.

BACKGROUND OF THE INVENTION

The statements in the background of the invention are provided to assist with understanding the invention and its applications and uses, and may not constitute prior art.

Since the capability of screen video recording in computer devices was made widely available, consumers have become accustomed to the benefits of screen recording. Nowadays, the rising trend of live sharing and streaming that involves simultaneous recording and transmission of audio-visual (AV) content, has allowed consumers to share their experiences and opinions in real-time. With consumers increasingly creating AV content and attending webinars, online meetings, and video conferences, screen video recording has not only become vital, but has increasingly involved the generation and manipulation of video content in real-time. In particular, the globally escalating variety of AV content has combined with the reduction of technical limitations that had previously prevented consumers from generating or viewing new content.

The significant surge of AV and media content generation, combined with remote AV conferencing, has made the simultaneous AV recording of users and their device screens ubiquitous. Gaming-related content alone is responsible for a massive amount of daily-generated content, where the gaming application is combined with a video or audio recording of the user. In addition to gaming, remote work and education are also among a rapidly growing list of applications requiring the simultaneous recording of the user and a Graphical User Interface (GUI) element on their display, such as a screen or an application window.

Although some software applications offer built-in recording and video processing, third-party solutions remain inevitable for most use cases. The digital AV and media recording solutions developed so far are not commensurate with the growing need for efficient and user-friendly AV recording.

Current window- and screen-recording solutions require an elaborate setup process, and lack the speed and simplicity required for mass-scale adoption. For example, a typical window- and screen-recording operation requires opening two applications on the user's device (i.e., the target software application to be recorded and the AV/media recording application itself), often requiring a login step into at least one of the two applications. A detection of active applications is subsequently carried out by the recording application to identify windows that are available for recording. The recording application then requires the user to go through multiple selection and confirmation steps in order to select which screen or window to record, and then to start the recording. Typically, window or screen recording can only start after the target window selection is completed and a "record" button is pressed.

The process of recording a screen or window is currently far from seamless; it requires planning and cannot be undertaken "on-the-fly" by the user. Therefore, there is a need for a solution that can perform the recording process quickly, combining the required steps into a process that is intuitive and seamless to the user.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

A method for recording a window in a user device is disclosed herein, the method including dragging and dropping a drag-to-record element onto a target GUI element (e.g., window or screen) to start a video recording of the window. Such a method combines the window selection and recording processes in a single drag-and-drop action, thus providing an intuitive, seamless, and speedy procedure to start recording the target window.

Accordingly, in one illustrative embodiment, a method for recording a Graphical User Interface (GUI) element on a user device is disclosed. The method includes first rendering a drag-to-record element on a display of the user device. Then, receiving and storing one or more parameters of the GUI element (such as, a window, screen, etc.). Then, determining one or more threshold edges of the GUI element based on the one or more parameters of the GUI element. Then, receiving a drop position of a drag-to-record element above the GUI element, in response to a dropping of the drag-to-record element by the user above the GUI element, where the drop position of the drag-to-record element above the GUI element is bounded by the one or more threshold edges of the GUI element. Finally, identifying the GUI element as a recording target based on the drop position of the drag-to-record element, and starting a recording of the GUI element based on identifying the GUI element as the recording target.

In another embodiment, the method further includes updating a current position of the drag-to-record element, in response to the user dragging the drag-to-record element on the display of the user device, and highlighting the GUI element as an indication of a possible selection of the GUI element, in response to the current position of the drag-to-record element being over the GUI element.

In one embodiment, the one or more parameters of the GUI element are selected from the group consisting of a dimension, a position, and one or more metadata of the GUI element.

In one embodiment, the one or more metadata of the GUI element comprises at least one of a GUI element name and a GUI element Universal Unique Identifier (UUID), where the dimension of the GUI element comprises a height and a width of the GUI element, and where the position of the GUI element is determined based upon one or more coordinates on the GUI.

In one embodiment, the one or more parameters of the GUI element are used to determine a size, a shape, and a position of the GUI element.

In another embodiment, the drag-to-record element is dragged by the user using one of a mouse down, mouse down and drag, a touch, and a drag option.

In one embodiment, rendering the drag-to-record element comprises rendering the drag-to-record element at a starting position on the display of the user device.

In one embodiment, the method further includes returning the drag-to-record element to the starting position, and canceling the GUI element selection as the recording target, in response to the user performing an escape action.

In one embodiment, the escape action comprises pressing an escape key of the user device.

In another embodiment, the method further includes generating a selection GUI element in response to a dragging of the drag-to-record element by the user away from the starting position, where the selection GUI element includes a representation of the GUI element, and where receiving the drop position of the drag-to-record element above the GUI element includes receiving the drop position of the drag-to-record element above the representation of the GUI element in the selection GUI element.

In yet another embodiment, the method further includes providing one or more recording control functions in response to identifying the GUI element as a recording target.

In one embodiment, the one or more recording control functions are selected from the group consisting of pause recording, delete recording, cancel recording, and start recording.

In another embodiment, the method further includes sending a recorded GUI element stream to a server recording module in response to starting the recording of the GUI element.

In one embodiment, the GUI element is selected from the group consisting of a window, a window header, a screen, a thumbnail, a representation icon, a start button, a menu, a menu item, a menu window representation, a dock, a dock item, a dock window representation, and an application icon.

In one embodiment, the receiving a drop position of a drag-to-record element is in response to a dropping of the drag-to-record element by the user above the GUI element and a simultaneous performing of a GUI element selection action by the user.

In one embodiment, the GUI element selection action includes pressing a predefined key (such as an escape key) of the user device.

In various embodiments, a computer program product is disclosed. The computer program may be used for recording a Graphical User Interface (GUI) element on a user device, and may include a computer-readable storage medium having program instructions, or program code, embodied therewith, the program instructions executable by a processor to cause the processor to perform steps to the aforementioned steps.

In various embodiments, a system is described, including a memory that stores computer-executable components, and a hardware processor, operably coupled to the memory, and that executes the computer-executable components stored in the memory, where the computer-executable components may include components communicatively coupled with the processor that execute the aforementioned steps.

In another embodiment, the present invention is a non-transitory, computer-readable storage medium storing executable instructions, which when executed by a processor, causes the processor to perform a process for recording a Graphical User Interface (GUI) element on a user device, the instructions causing the processor to perform the aforementioned steps. In yet another embodiment, the present invention is a computerized server comprising at least one processor, memory, and a plurality of computer codes embodied on said memory, said plurality of computer codes which when executed causes said processor to execute a process comprising the aforementioned steps. Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on the illustration of the nature, function, and product of the manufacturing method and devices described herein.

Embodiments of the present invention described herein are exemplary, and not restrictive. Embodiments will now be described, by way of examples, with reference to the accompanying drawings, in which.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
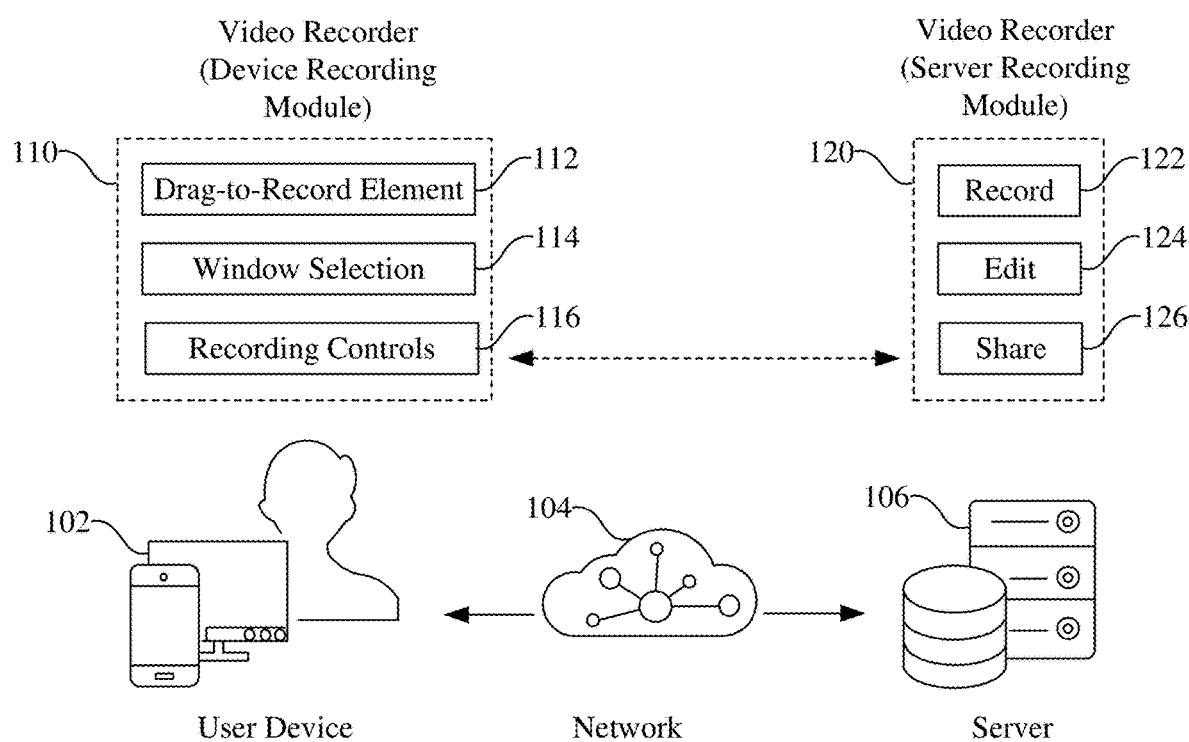
FIG. 1 shows a block diagram of a system for recording a window or a screen on a user device, in accordance with an exemplary embodiment of the present invention.

FIG. 1 shows a block diagram of a system for recording a GUI element such as a window or a screen on a user device, in accordance with an exemplary embodiment of the present invention. The system includes a user device (102) and a video recording server (106). In one embodiment, a device recording module (110) runs the recording frontend operations on the user device (102), while a server recording module (120) runs the recording backend operations on the server. In some embodiments, the user device (102) can be a mobile phone, a smartphone, a tablet, a laptop, or a desktop.

The device recording module (110) may be configured to provide a drag-to-record element (112), window selection (114), and recording control (116) functions. A user uses the drag-to-record element to record a window on the user device (102). The window selection (114) function receives one or more parameters of the window that is recorded or about to be recorded. The one or more parameters of the window are used to determine a size, a shape, and a position of the window. The device recording module (110) may be configured to provide one or more recording controls in response to identifying the window as a recording target. The one or more recording controls may include pause, delete, cancel, or start recording controls.

The device recording module (110) may be configured to render a drag-to-record element on a display of the user device (102), receive one or more parameters of the window, store the one or more parameters of the window, and determine the threshold edges of the window based on the one or more parameters of the window. In some embodiments, the one or more parameters of the window are selected from the group consisting of a dimension, a position, and one or more metadata of the window. The one or more metadata of the window comprise at least one of a window name and a window Universal Unique Identifier (UUID), where the dimension of the window comprises a height and a width of the window, and where the position of the window is determined based upon one or more coordinates on the user device (102). In one embodiment, UUIDs are used to provide anonymity with respect to the recording backend and the recording server, or to provide added security for the user.

Further, the device recording module (110) may be configured to receive a drop position of the drag-to-record element. The device recording module (110) may be configured to determine whether the drag-to-record element is above the window based on whether the position of the drag-to-record element is bounded by one or more threshold edges of the window. For example, if the position of the drag-to-record element is bounded by the four edges of the window, the device recording module (110) may determine that the drag-to-record element is above the window.

Figure 2:
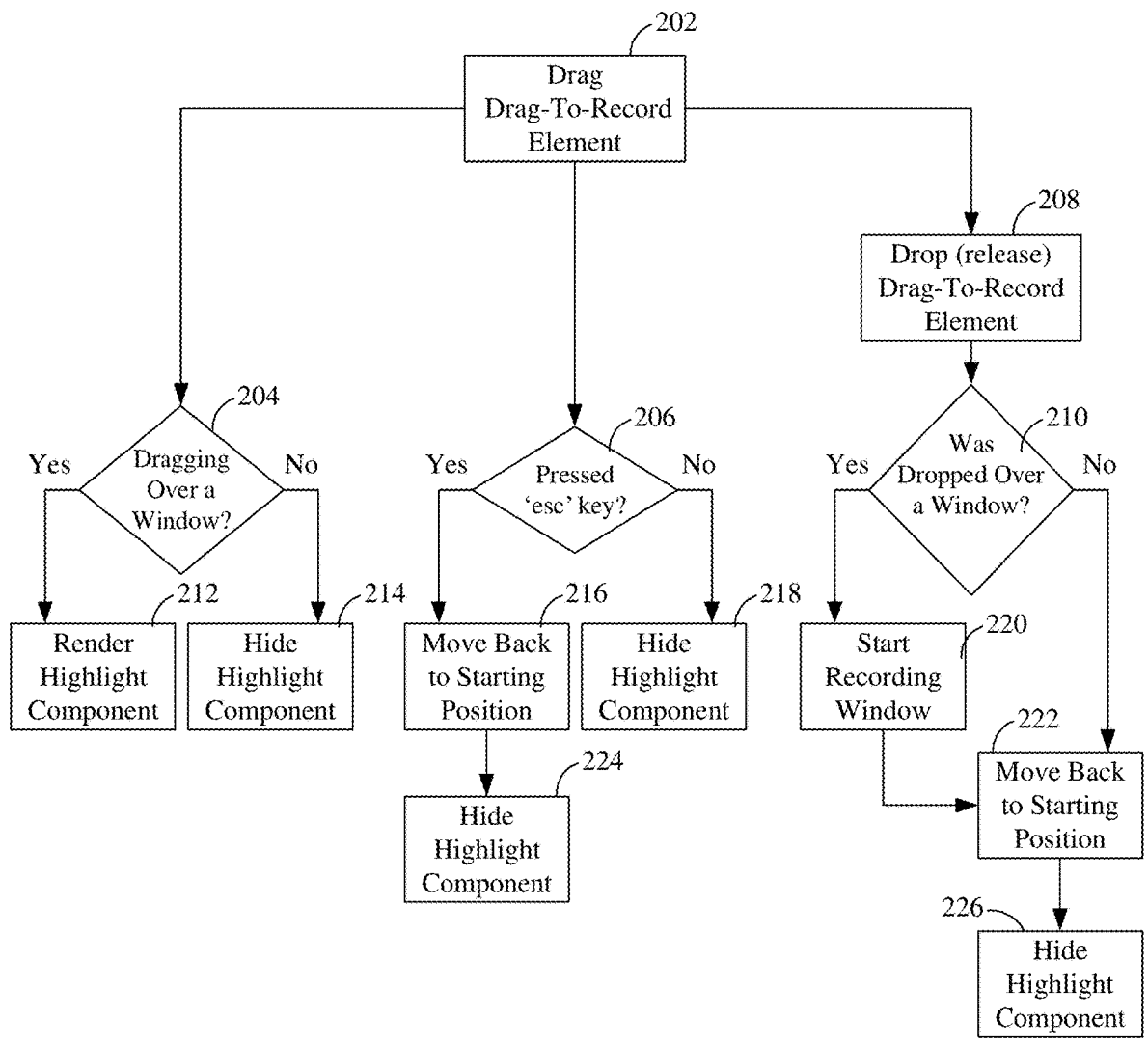
FIG. 2 shows a flowchart that details a process for recording a window, in accordance with an exemplary embodiment of the present invention.

Further, the device recording module (110) may be configured to identify the window as a recording target based on the drop position of the drag-to-record element above the window, start the recording of the window based on the identification of the window as the recording target. Once the recording of the window starts, the device recording module (110) may generate a recorded window stream and transmit the recorded window stream to the server recording module (120) through a network (104). FIG. 2 describes the window recording process in more detail. Screen recording is also described in the context of FIG. 2. A technical description of the video recording functionality is described in detail in the "Recorder Functionality" section below.

In some embodiments, the network (104) can be short wave, microwave, high frequency, wireless fidelity (Wi-Fi), Bluetooth technology, global system for mobile communications (GSM), code division multiple access (CDMA), second-generation (2G), third-generation (3G), fourth-generation (4G), 4G long term evolution (LTE), 4G LTE-A or any other wireless communication technology or standard to establish a wireless communication for exchanging data.

The server recording module (120) may be configured to receive a recorded window stream through a recording (122) function. Further, the server recording module (120) allows the user to edit (124) the recorded window stream, and share (126) the recorded window stream with other users, websites, or software applications.

FIG. 2 shows a flowchart that details a process of recording a window, in accordance with an exemplary embodiment of the present invention. The process shown in FIG. 2 may be executed by the device recording module (110). The drag-to-record element is initially rendered at a starting position on the display of the user device. The starting position of the drag-to-record element may be at any location on the display of the user device. Preferably, location of the display that is usually uncluttered is chosen for the starting location (e.g., lower left corner of the display). In some embodiments, the drag-to-record element is persistent at the starting position of the display. In one embodiment, the drag-to-record element is always on top of other windows. In one embodiment, the drag-to-record element is rendered as part of a permanent menu bar or a permanent start menu of the operating system of the device.

The process starts at step (202) with a movement of the drag-to-record element initiated by the user's dragging of the drag-to-record element. In one embodiment, the drag-to-record element is dragged by the user using one of a mouse down, mouse down and drag, a touch, and a drag option. At step (204), the process determines whether the drag-to-record element is positioned over a window. If the drag-to-record element is over a window, the process renders a highlight component highlighting the window (212). The highlight component may be configured for highlighting the window as an indication of a selection of the window. If the drag-to-record element is not positioned over a window, or if the user has dragged the drag-to-record element away from a window (204), the process hides the highlight component (214). At step (206), the user is enabled to press the "ESC" (i.e., escape) key of the user device. If the user presses the "ESC" key at step (206), the process returns the drag-to-record element to its starting position (216) and hides the highlight component (224). However, if the user does not press the "ESC" key at step (206), the process hides the highlight component (218) without moving the drag-to-record element back to its starting position. At step (208), the process enables the user to drop (i.e., release) the drag-to-record element. At step (210), the process determines whether the drag-to-record element was dropped over the window. If the drag-to-record element was dropped over the window, the process may be configured to start the recording (220) of the window based on the identification of the window as the recording target. The process then moves the drag-to-record element back to its starting position (222), and hides the highlight component (226). However, if the drag-to-record element was dropped at a position outside the boundaries of the window, the process skips the window recording step (220), moves the drag-to-record element back to its starting position (222) and hides the highlight component (226).

Multiple configurations for highlighting a window exist. In some embodiments, the highlight component (226) is a colored opaque or transparent layer covering the highlighted window. In other embodiments, it is a colored frame around the highlighted window.

In some embodiments, the position of the drag-to-record element may be determined by a central point of the drag-to-record element. In other embodiments, the drag-to-record element has a pointed shape (e.g., an arrow), where its position is determined by a single point on the display of the user device. Such embodiments may avoid situations where the drag-to-record element is positioned such that two or more windows partially or fully overlap with its bounds.

Note that a window may be defined either as a window containing multiple active tabs, or as a single tab belonging to a window with more than one active/open tab. Hence, the recording process may be configured to target the entire window including all of its tabs. Alternatively, the recording may be locked to one specific tab. The process may similarly be configured to target any subdivisions of a window (e.g., frames).

At step (206), the user is enabled to cancel the selection of the window as the recording target and return the drag-to-record element to its starting position by pressing the "ESC" key. The system may be configured to return the drag-to-record element to its starting position, cancel the window selection, or cancel an ongoing video recording using different inputs from the user. The term "escape action" henceforth refers to any user action that is configured to return the drag-to-record element to its starting position, cancel the window selection, or cancel an ongoing video recording. Escape actions are not limited to pressing the "ESC" key, and the process depicted in FIG. 2 may be configured to admit pressing any key of the device keyboard, or key combination (e.g., an escape shortcut such as "CTRL+ESC") as an escape action. Furthermore, escape actions include any specific action by the user that is detectable through any input of the user device (e.g., microphone, keyboard, touch screen, etc.), or any combination thereof.

Window and Screen Selection

The methods and systems described herein extend to recording any GUI element of the user device, including a logical screen. In particular, the methods and systems described herein can be extended to full-screen applications that typically take up the entire screen (e.g., games, presentation applications, or any screen-sharing applications). Such applications usually have application information or controls (e.g., game status) displayed in one or more corners of the screen. The drag-to-record element (e.g., Loom circle, Loom logo, or other recording symbol) would just hover over the full screen game. If a user drags the drag-to-record element, the only window to select would be the game screen, which may become highlighted. Once the user lets go of the drag-to-record element, the recording would begin.

While many devices run a single screen by default, a user device may run more than one logical screen simultaneously, allowing the user to switch between multiple screens. In some embodiments, the drag-to-record element is persistent on one or more screens. In various embodiments, the drag-to-record element is persistent on all screens, hence appearing at its starting position on the display, independently from the screen selected by the user.

In one embodiment, the user may combine dropping the drag-to-record element at step (208) with a screen selection action in order to select a full screen rather than an individual window for recording. The term "screen selection action" henceforth refers to any user action that is configured to trigger the selection of one of the device's active screens, when carried out by the user while dropping the drag-to-record element. In one embodiment, the screen selection action consists of pressing a specific predefined key (e.g., "S") or a predefined combination of keys (e.g., "Control+S").

Screen selection actions are not limited to pressing a key, and the process described above may be configured to admit pressing any key, or combination of keys of the device keyboard, as a screen selection action. Furthermore, screen selection actions may include any specific action by the user that is detectable through any input of the user device (e.g., microphone, keyboard, touch screen, etc.), or any combination thereof.

In one embodiment, dropping the drag-to-record element anywhere on the current screen while carrying out a screen selection action triggers a screen selection process, where the screen selection process enables the user to select one of the active screens of the device for recording. In this embodiment, the term "window" or "open window" (e.g., in FIG. 2) may apply to a full screen. If there is only one screen, the screen selection process automatically selects the full screen for recording. In embodiments where the user may toggle between multiple screens, the screen selection process may activate an intermediate "selection window" requiring the user to select among representations (e.g., thumbnails) of all the screens and windows run by the device. In one embodiment, the selection window is activated by moving (i.e., the beginning of the dragging) of the drag-to-record element from its starting position by the user. In some embodiments, the selection window shows an array of window and screen thumbnails representing all active windows and screens of the device. In one embodiment, dropping the drag-to-record element over one of the screens and windows represented in the selection window constitutes a selection of that screen or window and initiates the recording of that screen or window.

In one embodiment, the initiation of a dragging of the drag-to-record element by the user (i.e., the dragging of the drag-to-record element away from its starting position) triggers the generation of a selection window, where the selection window comprises representations of all screens and windows of the device that are available for recording. The dropping by the user of the drag-to-record element over one of the screens and windows of the selection window constitutes a selection by the user of that screen or window, and immediately initiates the recording of the selected screen or window. In this embodiment, a screen selection action is not required.

In some embodiments, a full-screen is used for the selection process. In this embodiment, rather than a selection window, a "selection screen" is generated for the user to drop the drag-to-record element over a representation of the desired window or screen. In various embodiments, a "selection GUI element" is generated, including representations of all GUI elements of the device, and instructions for the user to drop the drag-to-record element over a representation of the GUI element selected for recording. A GUI element can be a logical screen, an application window, or any representation thereof on the display of the user device. In particular, the GUI element can be a window, a window header, a screen, a thumbnail, a representation icon, a start button, a menu item, a menu, a menu window representation (e.g., a minimized window representation), a dock item, a dock, a dock window representation, an application icon, or any similar representation of a running application on the display of the user device.

Screen selection action are defined above as actions by the user that will initiate the selection of the screen as the recording target when carried out at the same time as the dropping of the drag-to-record element. In some embodiments, a more general "GUI element selection action" can be defined so as to select any specific subset or type of GUI elements. In addition to screens, GUI element subsets may include application windows, hidden (e.g., minimized) application windows, application windows running within the current screen, or any other GUI element subset.

Furthermore, the methods and systems described herein are not limited to recording a single window, as two or more windows can be recorded at the same time. During the first recording, the drag-to-record element would have returned to its starting position. The user can then simply drag the drag-to-record element over a second window to start a second recording process using the same camera A/V stream for both recordings. In another embodiment, a different camera or microphone can be selected using the recording controls. In some embodiments, the system may be configured for the recording to start without a camera stream or for the user to remove the camera bubble/stream during the recording.

In addition to any desktop operating system that has a windowing system, the methods and systems described herein may apply to tablets or cellular phones that operate applications in full-screen mode. In some embodiments, moving the drag-to-record element triggers the system to display all running applications in a tiled or windowed fashion. The user can then drop the drag-to-record element on the desired open application to start recording its screen.

The methods and systems described herein therefore enable the user to select and start recording any GUI element of the device by dropping the drag-to-record element on the GUI element or a representative thereof located on the screen or on a selection GUI element (e.g., a selection window).

Single-Action Recording and Streaming

In a preferred embodiment, the methods described herein enable the user to start a video recording of a window, combined with a simultaneous video recording of the user through a camera of the device, and a simultaneous audio recording of the user's voice through a microphone of the device, using a single action (i.e., moving/dropping the drag-to-record element). In another embodiment, the methods described herein enable the user to start a live video stream of a window, combined with a simultaneous live video stream of the user through a camera of the device, and a live simultaneous audio stream of the user's voice through a microphone of the device, using a single action (i.e., moving the drag-to-record element).

In one embodiment, moving the drag-to-record element from its starting position triggers the generation of a selection window on the display of the device, where the selection window comprises a representation (e.g., a thumbnail) of each device screen and window available for recording. The generation of a selection window enables the user to easily select one of the device screens and windows by dropping the drag-to-record element on it. The use of a selection window is particularly useful when multiple device screens are available, or when some of the windows are hidden (e.g., minimized).

Starting a recording of one of multiple windows or device screens usually requires the user to go through multiple stages: (1) requesting a window/screen recording, (2) selecting a target window/screen, and (3) clicking on a recording button to launch the recording. The additional step of confirming the use of recording peripherals, such as the camera or the microphone, are often required in systems where the latter are not preset. The methods described herein enable the user to carry out all three recording stages through the single action of moving the drag-to-record element to the target window.

Single-action recording simplifies considerably the processes of selecting a target window/screen and initiating a video/audio recording/stream, particularly when initiating a recording is time-sensitive. For example, rather than fumble through multiple selection stages, single-action recording by moving/dropping a persistent drag-to-record element enables video conference participants to initiate recordings and streams immediately and seamlessly. Single action recording therefore improves process speed and user experience by reducing the multi steps of selecting and recording a window to the single action of dragging/dropping a persistent, and hence easily accessible, button (i.e., the drag-to-record element). Single-action recording hence triggers the ability for the user to communicate and collaborate in a unique and unprecedented way, as dragging the drag-to-record element to a window immediately starts a recording feature of that window without having to select the window or click a "Record" button.

In some embodiments, the drag-to-record element can be used to start any number of recording functions targeted at a window, such as recording or taking a screenshot. In one embodiment, the drag-to-record element is combined with a distinct user input (e.g., Control/Command key, home button, etc.) to trigger an associated recording function. In another embodiment, a selection of two or more recording functions is offered to the user when the drag-to-record element is dropped. In yet another embodiment, multiple distinct drag-to-record elements are present at distinct starting positions, each associated with a recording function. For example, the user may select one of two distinct drag-to-record elements that are aligned on the bottom left of the screen: a "record" drag-to-record element, and a "screenshot" drag-to-record element. In yet another embodiment, the drag-to-record element is composed of multiple distinct drag-to-record element sectors, each associated with an associated recording function.

Figure 3:
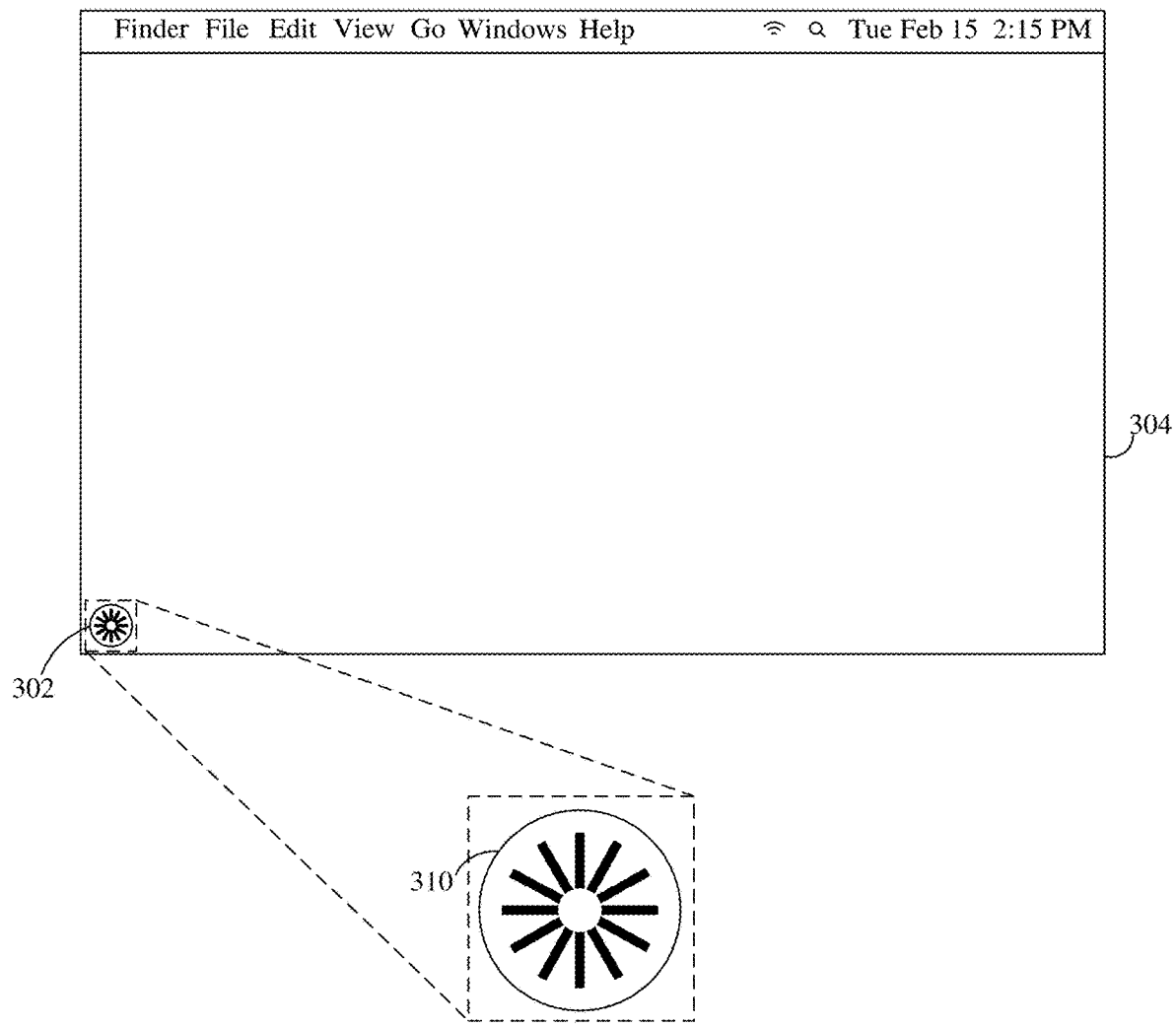
FIG. 3 illustrates a view of a drag-to-record element on a display of a user device, in accordance with an exemplary embodiment of the present invention.

FIG. 3 illustrates a view of a drag-to-record element (302) on a display (304) of a user device, in accordance with an exemplary embodiment of the present invention. The drag-to-record element function (112) of a device recording module (110) that is running on the user device may be configured for rendering a drag-to-record element (302) on the display (304) of the user device.

The drag-to-record element function (112) responsible for rendering the drag-to-record element (302) may be initiated by the operating system of the device or by a video recording application that was installed or pre-installed on the user device. The drag-to-record element function (112) may be initiated upon device startup or upon startup of the video recording application. Similarly, device recording module (110) responsible for all frontend recording operations (see FIG. 1) may be initiated by the operating system of the device or by a video recording application that was installed or pre-installed on the user device. The device recording module (110) may be initiated upon device startup or upon startup of the video recording application. The drag-to-record element (302) is rendered at a starting position located at a bottom left of the display (304) of the user device. FIG. 3 also shows a close-up view of the drag-to-record element (310).

In some embodiments, the drop element functions are run separately from the recording functionalities. The recording frontend, including the recording device module and all the recording functionalities, may thus only be started after a window selection is confirmed, as described above. The drop element position can be used to trigger any of the functionalities described herein.

Graphical User Interface and Window Parameters

Figure 4A:
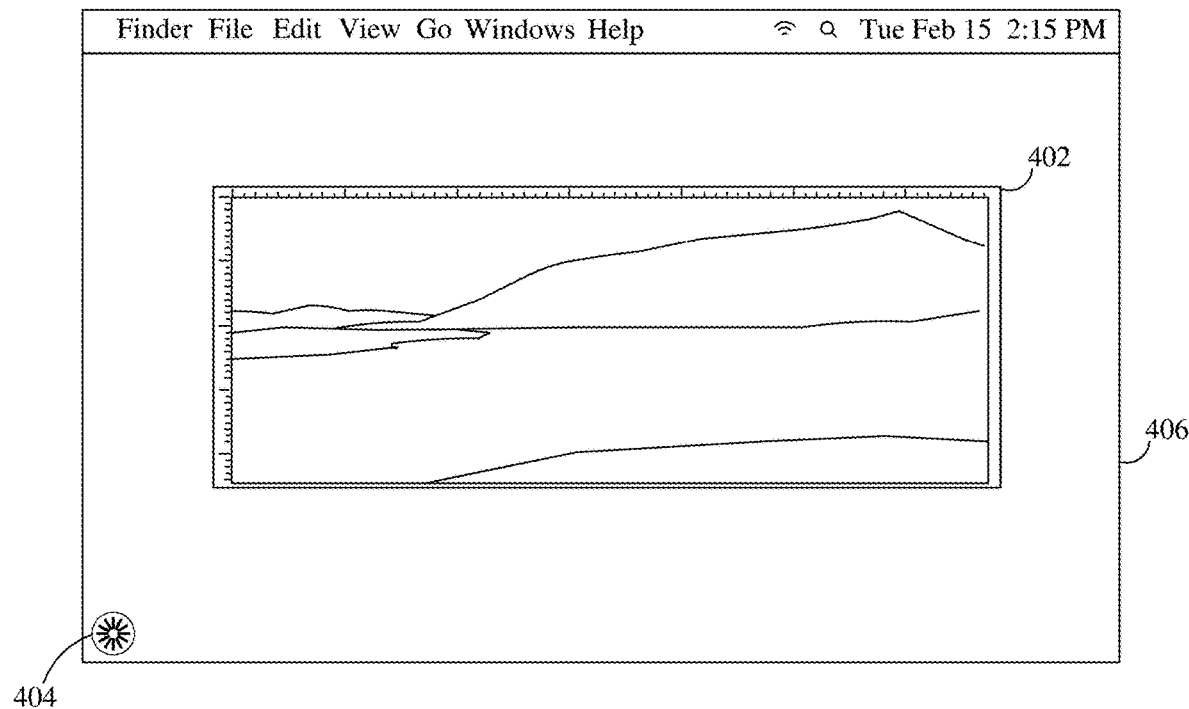
FIG. 4A illustrates a view of a window and the drag-to-record element on the display of the user device, in accordance with an exemplary embodiment of the present invention.
Figure 4B:
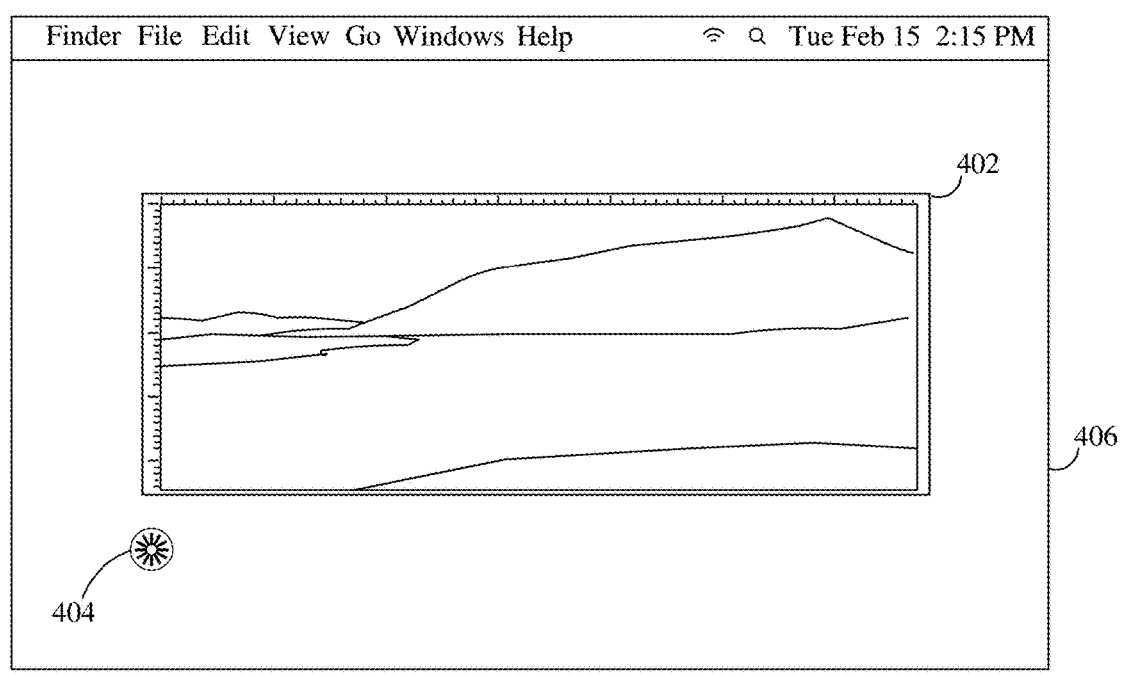
FIG. 4B illustrates dragging the drag-to-record element on the display of the user device, in accordance with an exemplary embodiment of the present invention.

FIG. 4A illustrates a view of a window (402) and the drag-to-record element (404) on the display (406) of the user device, in accordance with an exemplary embodiment of the present invention. In this embodiment, the drag-to-record element (404) is rendered at a starting position located at the bottom left of the display (406) of the user device. FIG. 4B illustrates the same display as FIG. 4A, showing the dragging of the drag-to-record element (404) on the display (406) of the user device, in accordance with an exemplary embodiment of the present invention. A mouse down, a mouse down and drag, a touch, or a drag option may be configured for dragging the drag-to-record element (404) from its starting position. The current position of the drag-to-record element (404) is updated, in response to the user dragging the drag-to-record element (404) on the display (406) of the user device.

Figure 5A:
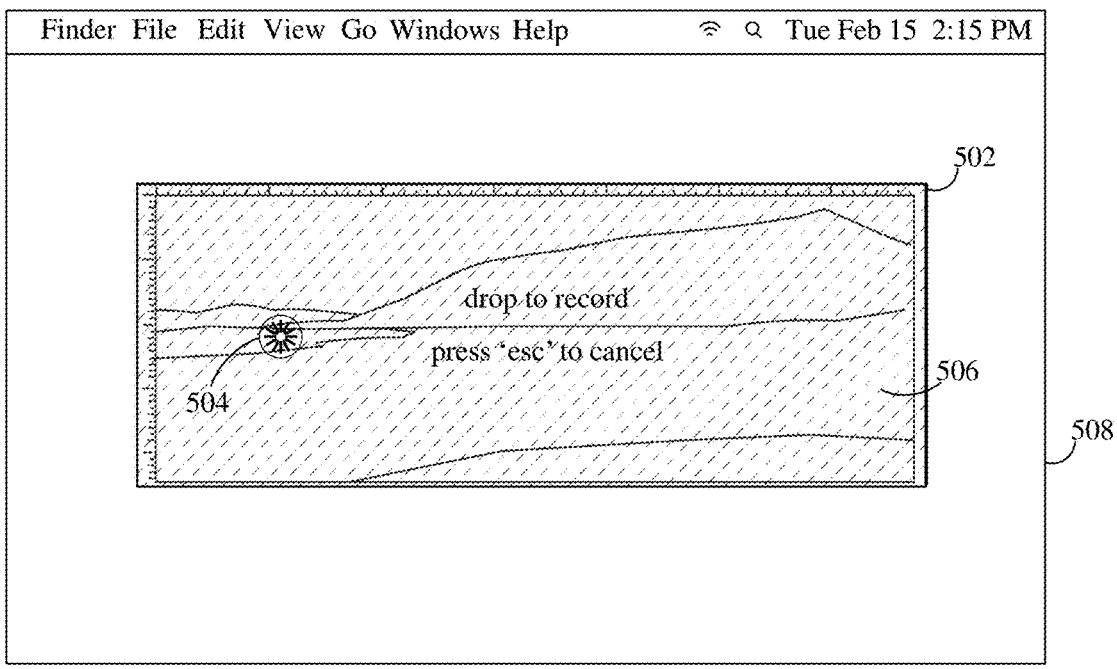
FIG. 5A illustrates a view of the drag-to-record element above the window on the display of the user device, in accordance with an exemplary embodiment of the present invention.

FIG. 5A illustrates a view of the drag-to-record element (504) above the window (502) on the display (508) of a user device, in accordance with an exemplary embodiment of the present invention. The device recording module may be configured for receiving one or more parameters of the window (502) where the one or more parameters of the window (502) are stored in a memory. The one or more parameters of the window may be configured for determining a size, a shape, and a position of the window. The one or more parameters of the window (502) may be selected from the group consisting of a dimension, a position, and one or more metadata of the window. The one or more metadata of the window includes at least one of a window name and a window Universal Unique Identifier (UUID). The dimension of the window (502) includes a height and a width of the window (502). Further, the position of the window (502) is determined based on one or more coordinates of the window (502) on the display of the user device. The one or more coordinates may be indicated by one specific point of the window specified by an X- and a Y-coordinate of the window (502), such as an edge corner (e.g., top left, or center) of the window (502). The user device, or the device recording module, may be configured for receiving a drop position of the drag-to-record element (504) above the window (502). A drop position of the drag-to-record element (504) above the window (502) is necessarily bounded by one or more threshold edges of the window (502). For example, a drop position of the drag-to-record element is above the window if its position is within the edges of the window. The user device, or the device recording module, is configured for identifying the window (502) as a recording target based on the drop position of the drag-to-record element (504) above the window (502). The user device, or the device recording module, is further configured for highlighting (506) the window (502) as an indication of a selection of the window (502), in response to the current position of the drag-to-record element (502) being over the window (504), as depicted in FIG. 5A. In some embodiments, highlighting (506) the window corresponds to covering the whole surface of the window with a distinct color (e.g., red or yellow). Other highlight components are discussed above.

Note that the parameters of the window (502) may be received before any movement of the drag-to-record element starts. In one embodiment, the system may collect parameters for some, or all, windows in the user device, before any indication from the user that recording is to start (e.g., when the video recording application starts, and/or when the user opens a new window). In another embodiment, the parameters of the window (502) may be received when the drag-to-record element starts moving. In yet another embodiment, the parameters of the window (502) may be received after the drag-to-record element is dropped, and a drop position is received. In this embodiment, the system determines the threshold edges of the window after the drag-to-record element is dropped by the user, in order to make a determination of whether the window is selected as a recording target.

In some embodiments, the window parameters (e.g., size of each window) are collected during the dragging of the drag-to-record element. The drag-to-record element may be operated within the device by any of the operating system (OS), the device recording module, or the recording application.

Figure 5B:
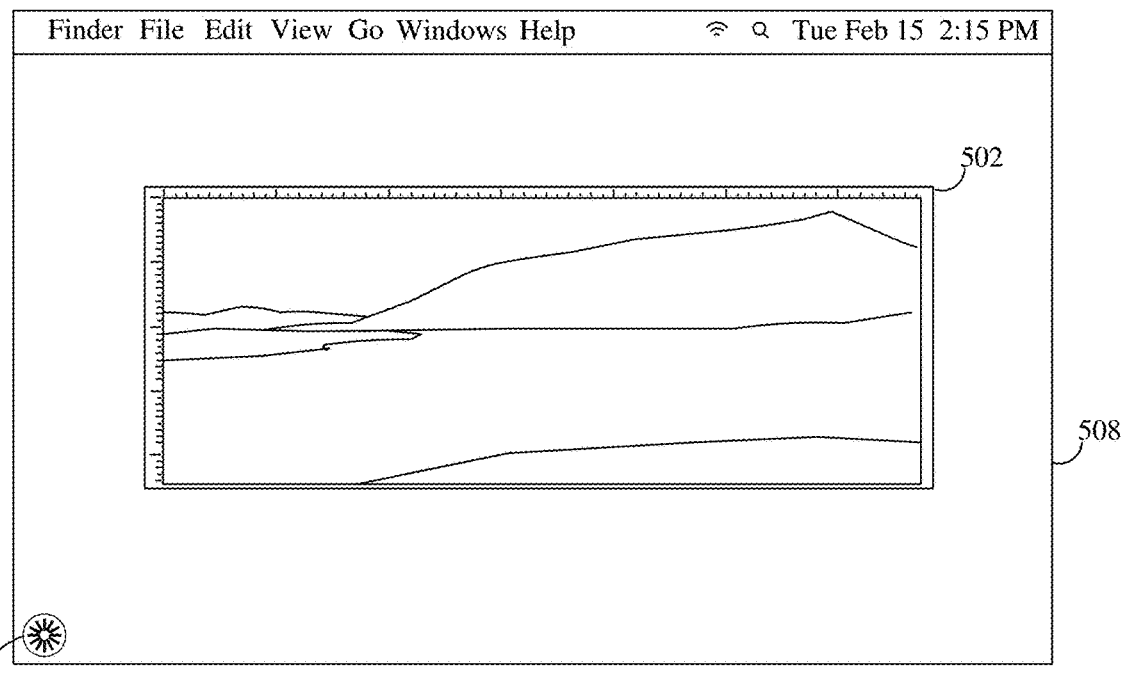
FIG. 5B illustrates a view of the display of the user device upon canceling the selection or recording of a window, in accordance with an exemplary embodiment of the present invention.

FIG. 5B illustrates a view of the display (508) of the user device upon canceling the selection or recording of a window (502), in accordance with an exemplary embodiment of the present invention. In one embodiment, a click of the escape key (e.g., the key marked "ESC") on the user device enables the user to cancel the selection of the window (502) as the recording target and further, enables the drag-to-record element (504) to return to its starting position, shown in FIG. 5B to be on the bottom left corner of the display. The user is also enabled to cancel the window (502) selection as the recording target by dropping the drag-to-record element (504) outside of all the windows on the display (508) of the user device (e.g., on the desktop of the user device), as described in FIG. 2.

Figure 6:
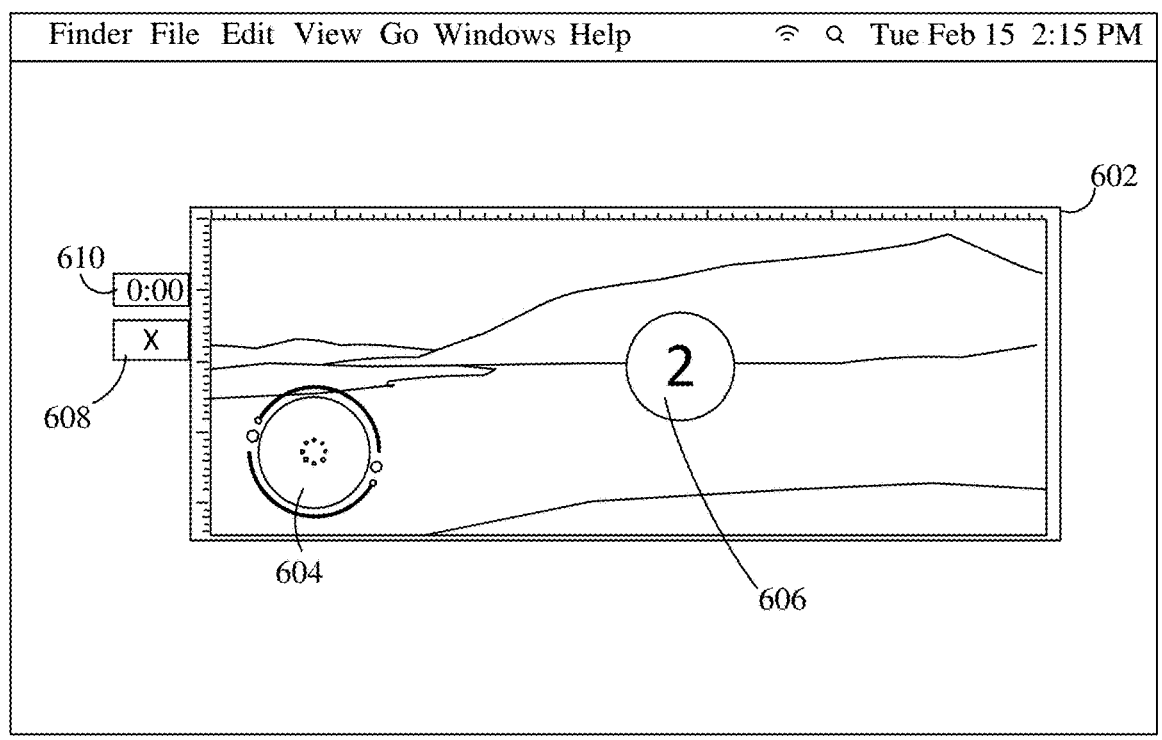
FIG. 6 illustrates a graphical user interface for video recording of a window, depicting a countdown feature and a camera bubble on the window, in accordance with an exemplary embodiment of the present invention.

FIG. 6 illustrates a graphical user interface for video recording of a window (602), depicting a countdown feature (606) and a camera bubble (604) on the window, in accordance with an exemplary embodiment of the present invention. Upon identifying the window (602) as a recording target, and in addition to moving the drag-to-record element back to its starting position and hiding the highlight component of the selected window (see steps 222 and 226 in FIG. 2), the device recording module may be configured for initiating a countdown feature (606). The countdown feature (606) may be configured to represent the time remaining before the recording of the window (602) starts. Further, the device recording module may generate a camera bubble (604) and provide one or more recording controls to the user, including an escape "x" button (608) and a recorded video length feature (610). In the embodiment of FIG. 6, the camera bubble is shown during initialization (604). The embodiment of FIG. 6 further renders the recording controls (608-610) on the side of the window (602). Furthermore, it may include the dimming of the display of the user device outside the window (602) before and during the recording of the window (602).

Figure 7:
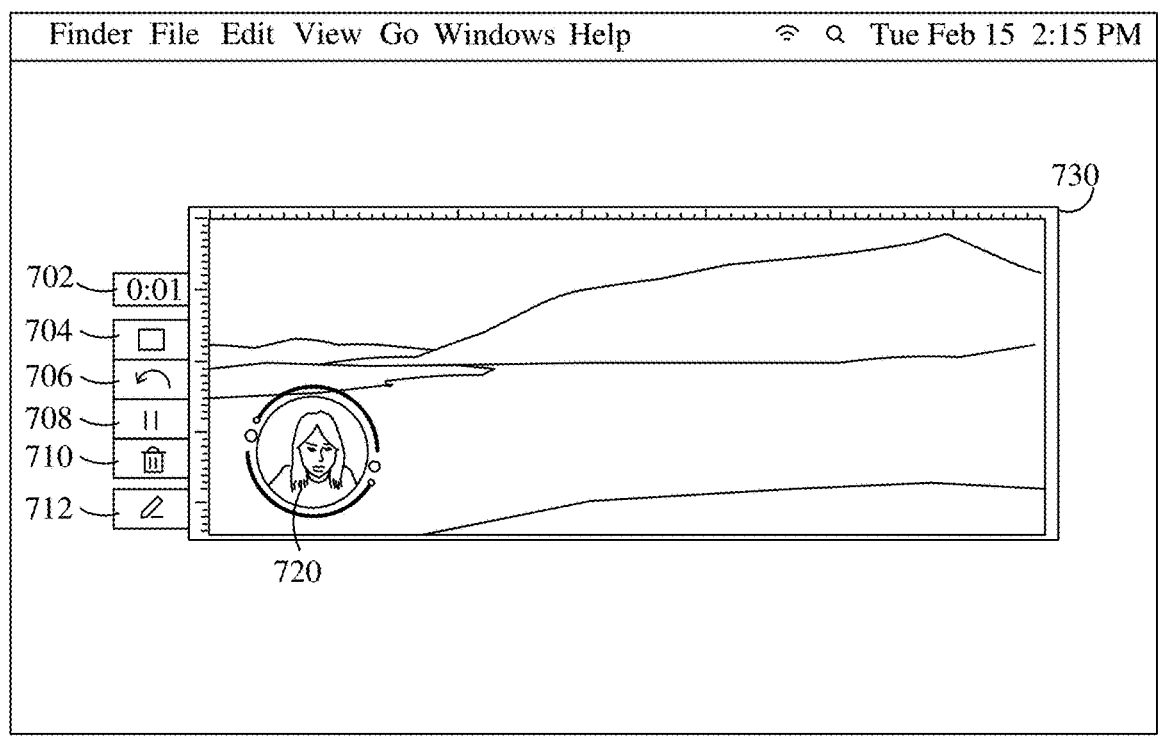
FIG. 7 illustrates a graphical user interface for video recording of a window, depicting recording control functions and a camera bubble during a recording session, in accordance with an exemplary embodiment of the present invention.

FIG. 7 illustrates a graphical user interface for video recording of a window (730), depicting recording control functions (702-712) and a camera bubble (720) during a recording session, in accordance with an exemplary embodiment of the present invention. After the start of the recording of the window (730), the device recording module is configured for sending the recorded window stream to a server recording module located on a video recording server. The device recording module may also generate a camera bubble (720). In one embodiment, the camera bubble (720) appears embedded within the window (730) on the display of the user device. The camera bubble (720) may display additional A/V controls as well as a view of the user as generated by a selected camera of the user device. In the embodiment of FIG. 7, the recording control functions are rendered on a side of the window (730) and include recorded video length (702), stop recording (704), open additional controls (706), pause recording (708), delete recording (710), and edit options (712) features.

Figure 8:
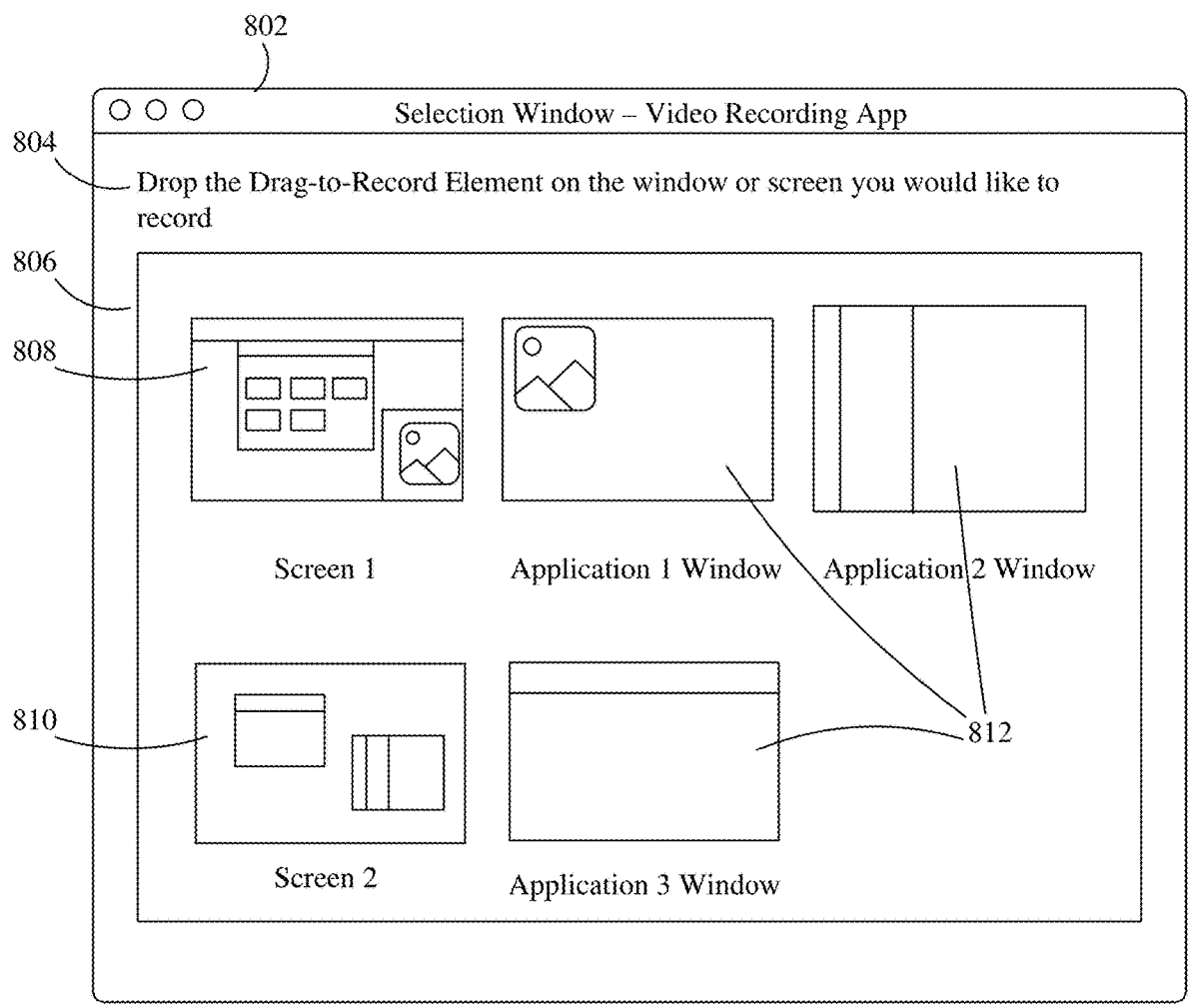
FIG. 8 illustrates a graphical user interface for video recording of a screen or window, depicting a selection window enabling the user to select a target screen or window by dropping the drag-to-record element, according to one embodiment of the present invention.

FIG. 8 illustrates a graphical user interface for video recording of a screen or window, depicting a selection window enabling the user to select a target screen or window by dropping the drag-to-record element, according to one embodiment of the present invention. In one embodiment, the selection window (802) is generated in response to the dragging of the drag-to-record element away from its starting position. In another embodiment, it may be generated in response to the dropping of the drag-to-record element outside any of the windows present on the screen. In yet another embodiment, it may be generated by the dragging of the drag-to-record element in combination with a predefined action of the user such as the pressing of a specific key of the device (i.e., a selection window action).

In the illustrative graphical user interface of FIG. 8, the selection window (802) includes a representation of each active screen and window on the device. In one embodiment, these representations are grouped together as a grid (806). The terms "active screen" or "screen" herein describe the logical screens that are currently defined and being operated by the device. The terms "active window" or "window" herein describe windows belonging to applications that are currently running on the device, whether they are open or hidden (e.g., minimized). Typically, a representation of a screen or window is a thumbnail depicting the current contents of the screen or window. In FIG. 8, the grid (806) of active screens and windows shows representations of two screens (808 and 810) and three windows (812) belonging to three applications.

In FIG. 8, the selection window (802) also includes instructions (804) for the user to drop the drop-to-record element over the representation of the screen or window selected for recording. The dropping of the drop-to-record element on the selected window or screen allows the user to select the recording target and launch the recording in a single action. The next section describes different methods enabling the user to select and record a screen or window in a single action using a drag-to-record element.

Drag-and-Drop Actions

A drag-and-drop action is defined herein as any user action connecting two GUI elements on the display. The methods described herein include, but are not limited to, a user's drag-and-drop action using a mouse on a desktop computer. In various embodiments, the drag-to-record element is dragged by the user using one of a mouse down, mouse down and drag, a touch, and a drag option. A drag-and-drop action encompasses any action, or potential action, that the user may carry out to move the drag-to-record element over a window, screen, or GUI element of the device.

Drag-and-drop actions therefore include drag-and-drop-equivalent actions as defined in touchscreen, smartphone, and tablet devices. In some devices, a click on the drag-to-record element followed by a click on a GUI element may be used as a drag-and-drop action, and is therefore within the scope of the present invention. In some devices, touching the drag-to-record element then touching the target GUI element (e.g., window, application icon), while simultaneously pressing a button of the device, or indeed performing any combination of actions predefined for connecting the drag-to-record element with the target GUI elements on the display, is equivalent to a drag-and-drop action, and is hence within the scope of the present invention.

For both described clicking and touching drag-and-drop-equivalent actions, clicking/touching the GUI element after clicking/touching the drag-to-record element is equivalent to a dropping of the drag-to-record element by the user above the GUI element, and may lead to receiving a drop position of the drag-to-record element above the GUI element.

Embodiments using Screen Selection Action and Selection Window

Figure 9:
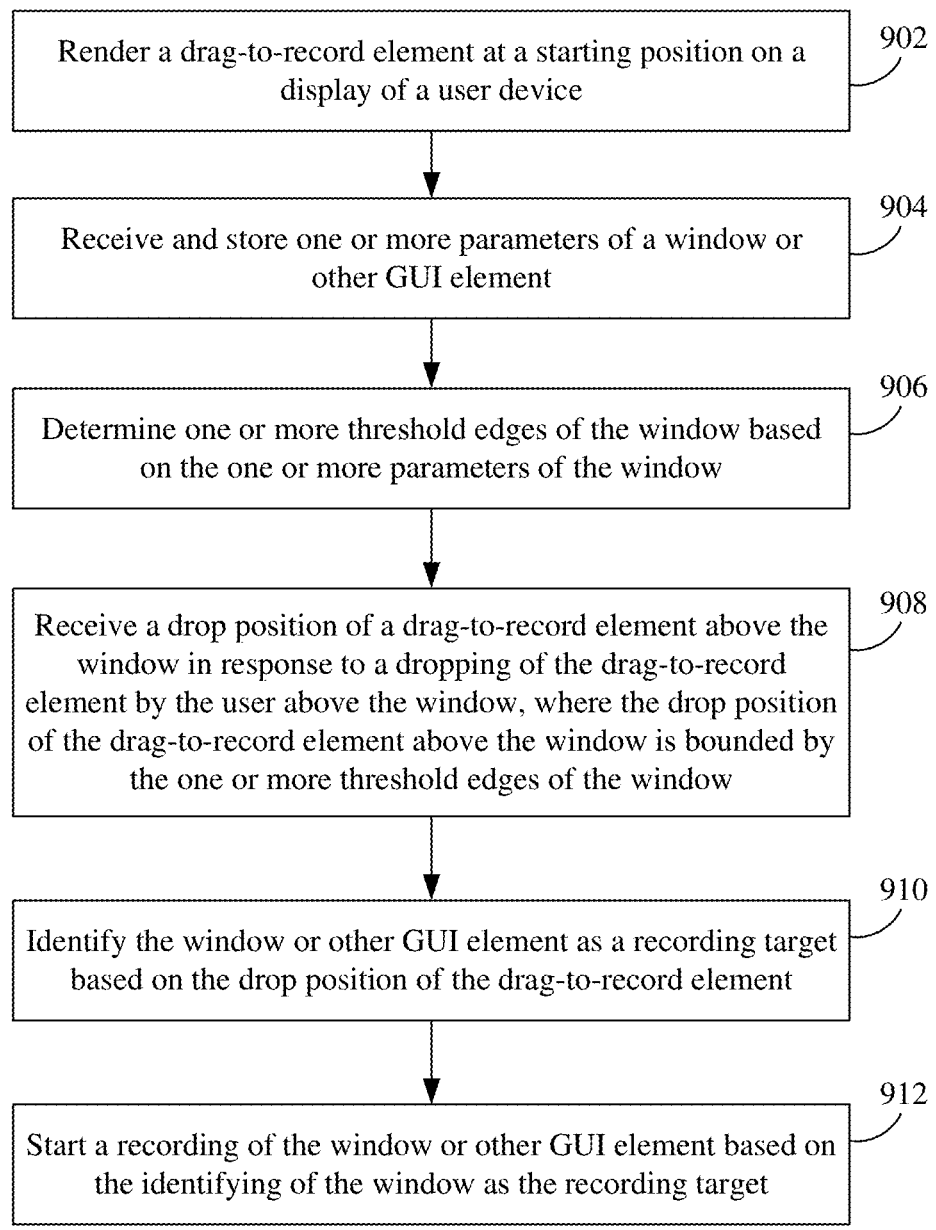
FIG. 9 shows a flowchart detailing a process for implementing video recording of a window using a single drag-to-record action, according to one embodiment of the present invention.
Figure 10:
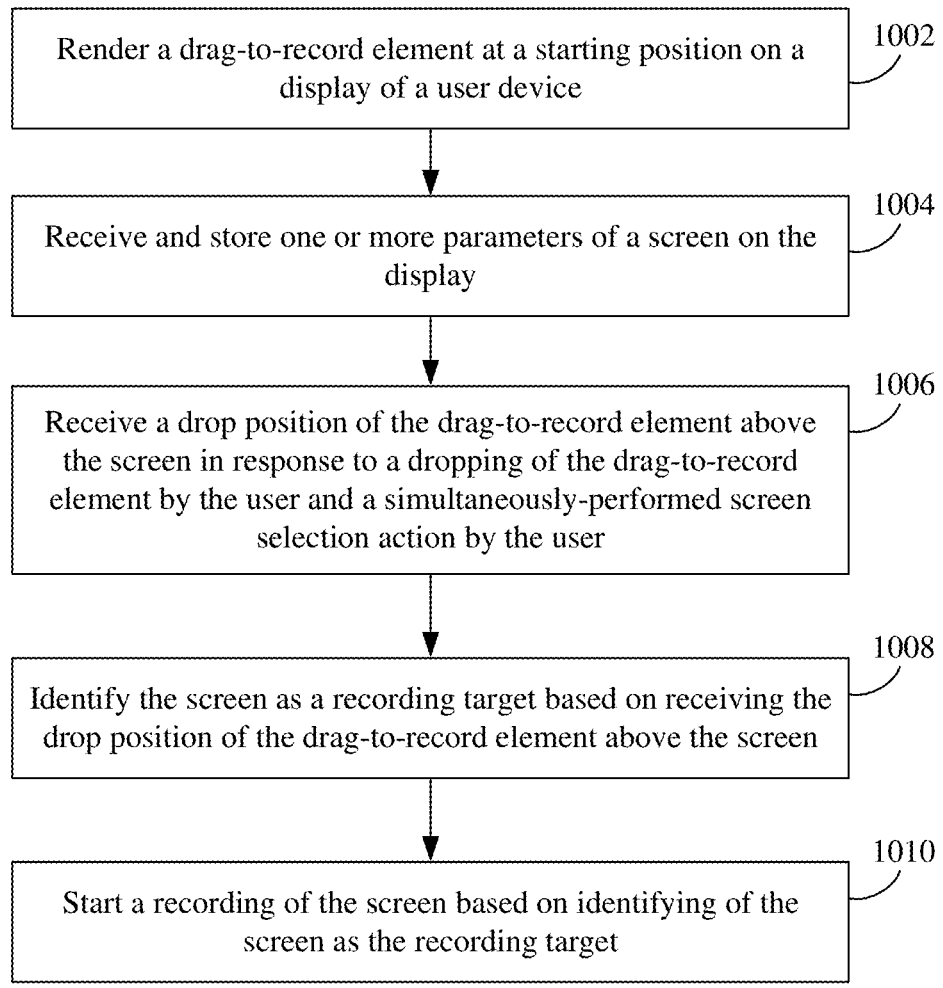
FIG. 10 shows a flowchart detailing a process for implementing video recording of a screen using a single drag-to-record action, according to one embodiment of the present invention.
Figure 11:
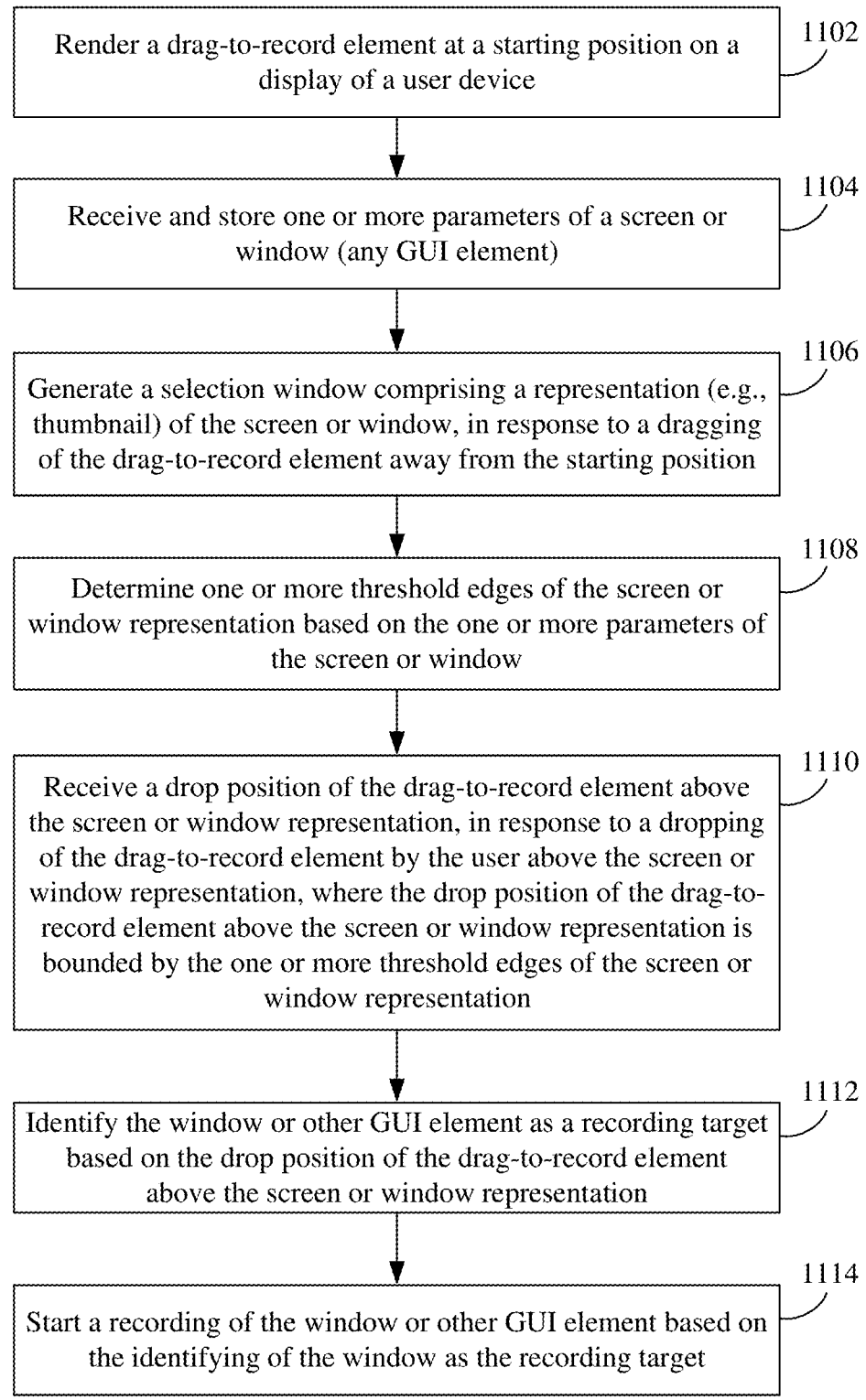
FIG. 11 shows a flowchart detailing a process for implementing video recording of a screen or a window using a single drag-to-record action and a selection window, according to one embodiment of the present invention.

FIGS. 9-11 show illustrative flowcharts of the methods discussed above, enabling a user to record a window or a screen of the user device through various embodiments of the present invention. FIG. 9 shows a flowchart detailing a process for implementing video recording of a window using a single drag-to-record action, according to one embodiment of the present invention.

In step 902, a drag-to-record element is rendered at a starting position on a display of the user device. In step 904, one or more parameters of a window or other GUI element are received and stored. In step 906, one or more threshold edges of the window are determined, based on the one or more parameters of the window. In step 908, a drop position of a drag-to-record element above the window is received in response to a dropping of the drag-to-record element by the user above the window, where the drop position of the drag-to-record element above the window is bounded by the one or more threshold edges of the window. In step 910, the window or other GUI element is identified as a recording target based on the drop position of the drag-to-record element. Finally, in step 912, a recording of the window or other GUI element is started based on identifying of the window as the recording target. In some embodiments, the windows or other GUI elements present under the drag-to-record element while the user is dragging it are highlighted as potential target windows, as described in FIG. 2 and illustrated in FIG. 5. FIGS. 3-7 illustrate graphical user interfaces associated with the various steps of FIG. 9.

FIG. 10 shows a flowchart detailing a process for implementing video recording of a screen using a single drag-to-record action, according to one embodiment of the present invention. In step 1002, a drag-to-record element is rendered at a starting position on a display of the user device. In step 1004, one or more parameters of a screen on the display are received and stored. In step 1006, a drop position of the drag-to-record element above the screen is received in response to a dropping of the drag-to-record element by the user and a simultaneously-performed screen selection action by the user. In some embodiments, the screen selection action is a keyboard shortcut (e.g., "CTRL+S") or a device key shortcut (e.g., "Home+Volume-Up"). In another embodiment, the drop position of the drag-to-record element is located not only above the screen but also outside any window eligible for recording (e.g., open application windows). In this embodiment, the screen is selected as the recording target when the user drops the drag-to-record element on the screen, outside any window, while performing the screen selection action. In step 1008, the screen is identified as a recording target based on receiving the drop position of the drag-to-record element above the screen. Finally, in step 1010, the recording of the screen is started based on identifying of the screen as the recording target.

FIG. 11 shows a flowchart detailing a process for implementing video recording of a screen or a window using a single drag-to-record action and a selection window, according to one embodiment of the present invention. In step 1102, a drag-to-record element is rendered at a starting position on a display of the user device. In step 1104, one or more parameters of a window or screen (or any GUI element) are received and stored. In step 1106, a selection window comprising a representation (e.g., thumbnail) of the screen or window is generated in response to a dragging of the drag-to-record element away from the starting position. FIG. 8 illustrates a selection window within an exemplary graphical user interface for single-action drag-to-record screen or window recording. In step 1108, one or more threshold edges of the screen or window representation are determined based on the one or more parameters of the screen or window. In step 1110, a drop position of a drag-to-record element above the screen or window representation is received in response to a dropping of the drag-to-record element by the user above the screen or window representation, where the drop position of the drag-to-record element above the screen or window representation is bounded by the one or more threshold edges of the screen or window representation. In step 1112, the screen or window is identified as a recording target based on the drop position of the drag-to-record element above the screen or window representation. Finally, in step 1114, the recording of the screen or window is started based on identifying of the screen or window as the recording target. In addition to the illustration of FIG. 8, the use of a selection window (or, more generally, a selection GUI element) to enable the user to select and initiate a screen or window recording using a single drag-to-record action is discussed in the context of FIG. 2 and in the subsequent section on "Single-Action Recording and Streaming".

For all predefined user actions configured to use device keys or shortcuts (e.g., escape or screen selection actions), there may be shortcut conflicts with the operating system or with other running applications (e.g., the recorded window/GUI element). In some embodiments, the system may be configured to detect shortcut conflicts and warn the user before they are applied. In other embodiments, the system may be configured so that the predefined shortcuts override the shortcuts defined for one or more applications of the user device.

Dragging a Window over the Drag-to-Record Element

Dragging a window over the drag-to-record element, rather than dragging the drag-to-record element over the window, in order to start streaming or recording the dragged window, is within the scope of the present invention. In one embodiment, one or more drag-and-record element parameters, such as its size and position on the display, are received in order to determine whether the drop position of the GUI element falls over the drag-and-record element. In another embodiment, the "initial position" of the GUI element (i.e., its position before the drag-and-drop action) is also received. In this embodiment, if the GUI element is dropped over the drag-to-record element, the GUI element returns to its initial position ahead of the recording process.

More specifically, a method for recording a GUI element on a user device is disclosed, including rendering a drag-to-record element on a display of the user device; receiving one or more parameters of the drag-to-record element; determining one or more threshold edges of the drag-to-record element based on the one or more parameters of the drag-to-record element; receiving one or more parameters of the GUI element; receiving a drop position of the GUI element above the drag-to-record element, in response to a dropping of the GUI element by the user above the drag-to-record element, wherein the drop position of the GUI element above the drag-to-record element is bounded by the one or more threshold edges of the drag-to-record element; identifying the GUI element as a recording target based on the drop position of the GUI element; and starting a recording of the GUI element based on identifying the GUI element as the recording target, using the one or more parameters of the GUI element.

In one embodiment, the method further includes updating a current position of the GUI element, in response to the user dragging the GUI element on the display of the user device; and highlighting one of the drag-to-record element and the GUI element as an indication of a possible selection of the GUI element, in response to the current position of the GUI element being over the drag-to-record element.

In another embodiment, the one or more parameters of the GUI element are selected from the group consisting of a dimension, a position, and one or more metadata of the GUI element.

In one embodiment, the one or more metadata of the GUI element comprises at least one of a GUI element name and a GUI element Universal Unique Identifier (UUID), wherein the dimension of the GUI element comprises a height and a width of the GUI element, and wherein the position of the GUI element is determined based upon one or more coordinates on the GUI.

In another embodiment, the GUI element is dragged by the user using one of a mouse down, mouse down and drag, a touch, and a drag option.

In yet another embodiment, the one or more parameters of the GUI element are used to determine a size, a shape, and an initial position of the GUI element, and the one or more parameters of the drag-to-record element are used to determine a size, a shape, and a position of the drag-to-record element.

In one embodiment, the method further includes returning the GUI element to the initial position of the GUI element, and canceling the GUI element selection as the recording target, in response to the user performing an escape action.

In another embodiment, the escape action comprises pressing a predefined key of the user device.

In one embodiment, the method further includes returning the GUI element to the initial position of the GUI element, and providing one or more recording control functions in response to identifying the GUI element as the recording target.

In another embodiment, the one or more recording control functions are selected from the group consisting of pause recording, delete recording, cancel recording, and start recording.

In yet another embodiment, the method further includes sending a recorded GUI element stream to a server recording module in response to starting the recording of the GUI element.

In one embodiment, the GUI element is selected from the group consisting of a window, a window header, a thumbnail, a screen thumbnail, a representation icon, a start button, a menu, a menu item, a menu window representation, a dock, a dock item, a dock window representation, and an application icon.

In another embodiment, the receiving the drop position of the GUI element is in response to a dropping of the GUI element by the user above the drag-to-record element and a simultaneous performing of a GUI element selection action by the user.

In yet another embodiment, the GUI element selection action comprises pressing a predefined key of the user device.

Recorder Functionality

Embodiments of the present invention relate to methods and systems for sharing media such as audio, video, and images (e.g., screen-capture images) instantaneously and asynchronously. FIGS. 12A, 12B, 13 and 14 provide a detailed description of the recorder functionality pertinent to the methods and systems described herein, particularly the video recording user device and server modules (see FIG. 1).

Figure 12A:
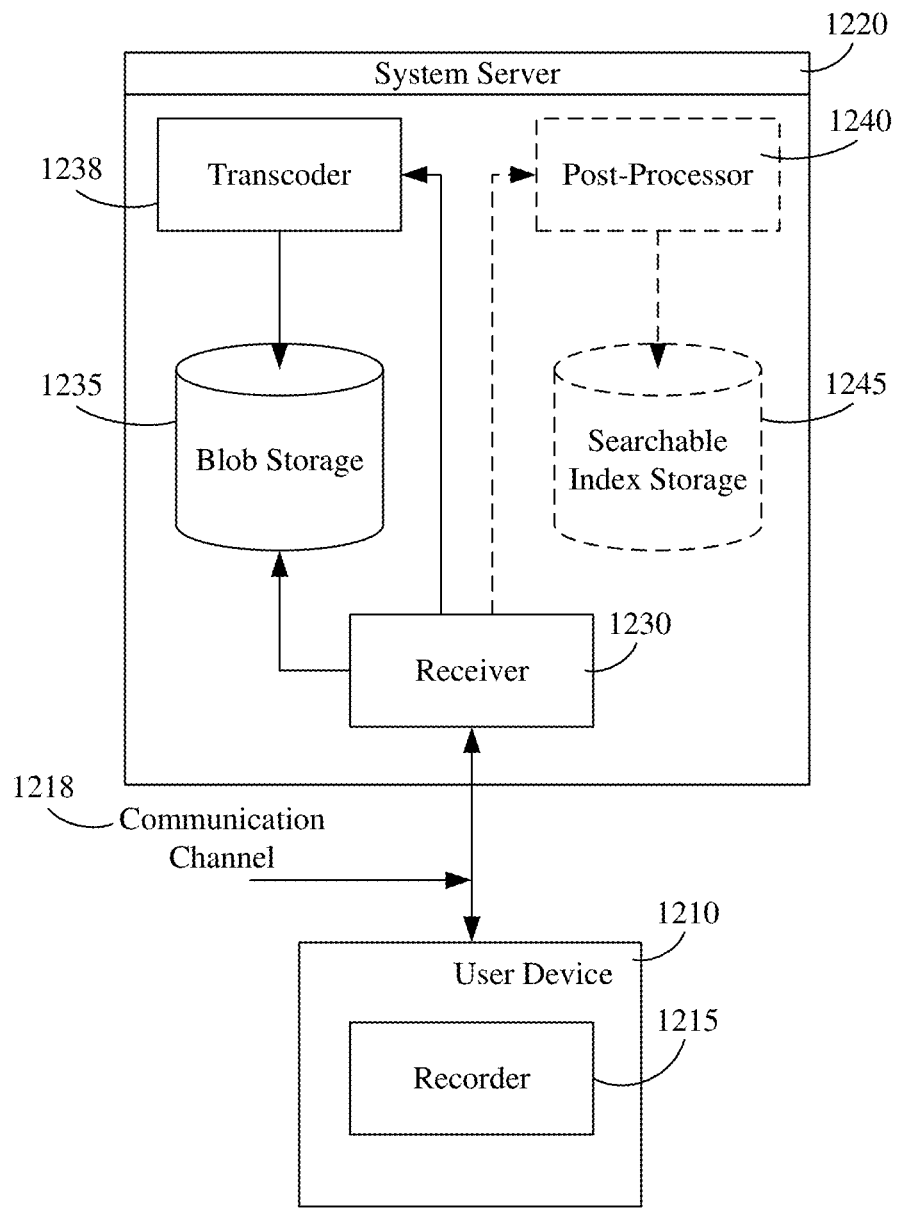
FIG. 12A is an illustrative system architecture diagram showing video recording functionality, according to one embodiment of the present invention.

FIG. 12A is an illustrative system architecture diagram showing video recording functionality, according to one embodiment of the present invention. A user device 1210 contains a recorder 1215, which is capable of recording from a display screen on the user device 1210, from an application displayed on the user device 1210, or from one or more optical cameras on the user device 1210. The user device 1210 is connected to a receiver 1230 within a system server 1220 through a communication channel 1218. The communication channel 1218 may be established between the user device 1210 and the system server 1220 before the recording is initiated, while the recording takes place, or after recording has been completed. The receiver 1230 may send the received recording directly to a storage unit such as a blob storage 1235 on the system server 1220. In some embodiments, such storage units may be permanent, and may be used to store raw data or post-processed data such as transcoded data. In some embodiments, such storage units may be non-permanent, thus allowing temporary caching of the data stream while the data stream is handled by a post-processor, or post-processing pipeline, such as a dedicated transcoder 1238 or general post-processor 1240. Each of the transcoder 1238 or post-processor 1240 may be physical or logical components implemented in dedicated or general purpose hardware. In some embodiments, received data are first post-processed through a transcoder 1238 before the transcoded media recording is sent to blob storage 1235. Transcoding may be considered as a post-processing process, as raw or even post-process data is converted from one format to another. Concurrently or in tandem, the received recording may optionally be post-processed through a post-processor 1240, which may perform functions such as audio extraction, object detection, speech-to-text conversion, phoneme search, eye tracking, sentiment analysis, behavioral analysis, and gesture analysis. The post-processor may further be connected to optional searchable index storage 1245. Although not shown explicitly, post-processed media recordings generated by the post-processor 1240 may also be passed to the transcoder 1238, stored in the blob storage 1235, or sent to any other permanent or non-permanent storage units or control components that provide video hosting and sharing services such as on-demand replay, streaming, video searches, and user management.

Figure 12B:
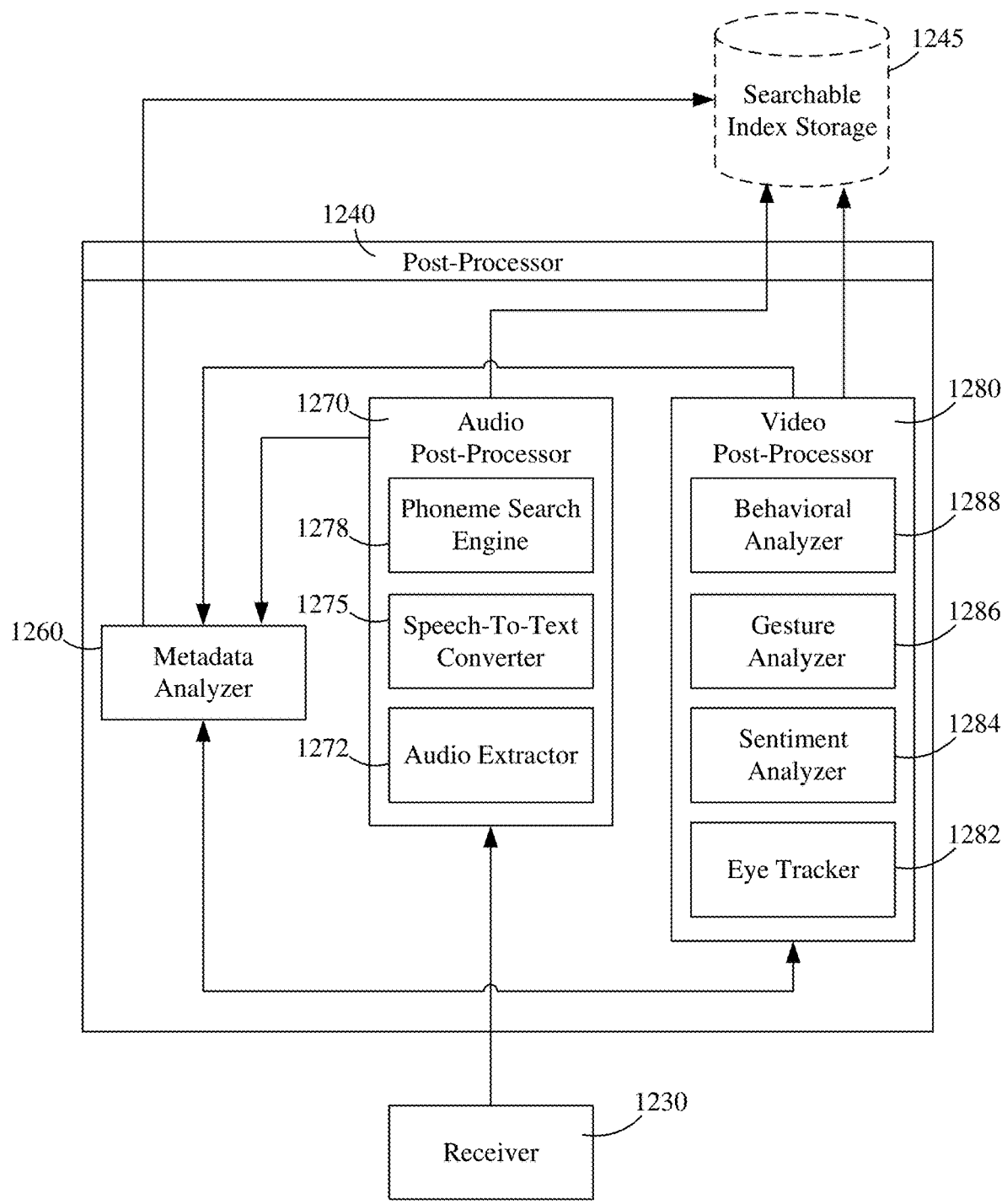
FIG. 12B is an illustrative architecture diagram for the video recording post-processor, according to one embodiment of the present invention.

FIG. 12B shows an illustrative architecture diagram for the post-processor 1240. In some embodiments, media data received at the receiver 1230 may get sent to a metadata analyzer 1260, audio post-processor 1270, and/or video post-processor 1280. The metadata analyzer 1260 analyzes any metadata that may already be present in the received media data, and may further generate individual metadata items as needed. In the audio post-processor 1270, audio extraction may be performed by an audio extractor 1272, speech-to-text conversion may be done by a speech-to-text converter 1275, and phoneme search may be performed by a phoneme search engine 1278. Audio data may be processed concurrently or in tandem in different orders through these modules. In the video post-processor 1280, video features including, but not limited to, eye movements, sentiments, gestures, and behaviors, may be analyzed by an eye tracker 1282, a sentiment analyzer 1284, a gesture analyzer 1286, and a behavioral analyzer 1288. As in the audio post-processor, video data may be processed concurrently or in tandem in different orders through these modules. The audio post-processor 1270 and/or video post-processor 1280 may feed their results back into the metadata analyzer 1260. In some embodiments, the received recording is streamed asynchronously as it is being recorded. In some embodiments, the received media data may be from an upload of a recorded media file. In both cases, a self-contained data unit containing information about the video file called a metadata atom may be used for playing a streamable media file. The metadata analyzer 1260 may generate a metadata atom in real-time as the media stream object is uploaded to the server if such a metadata atom does not already exist, or move it in real-time to the beginning of a media file if it already exists. The metadata analyzer 1260 may write a new file with that metadata atom at the front into a searchable index storage 1245. The rest of the upload from the receiver, or processed versions from the video post-processor 1280, may be streamed and tacked onto that metadata atom so that the file is immediately ready for consumption and storage as soon as the upload completes.

Figure 13:
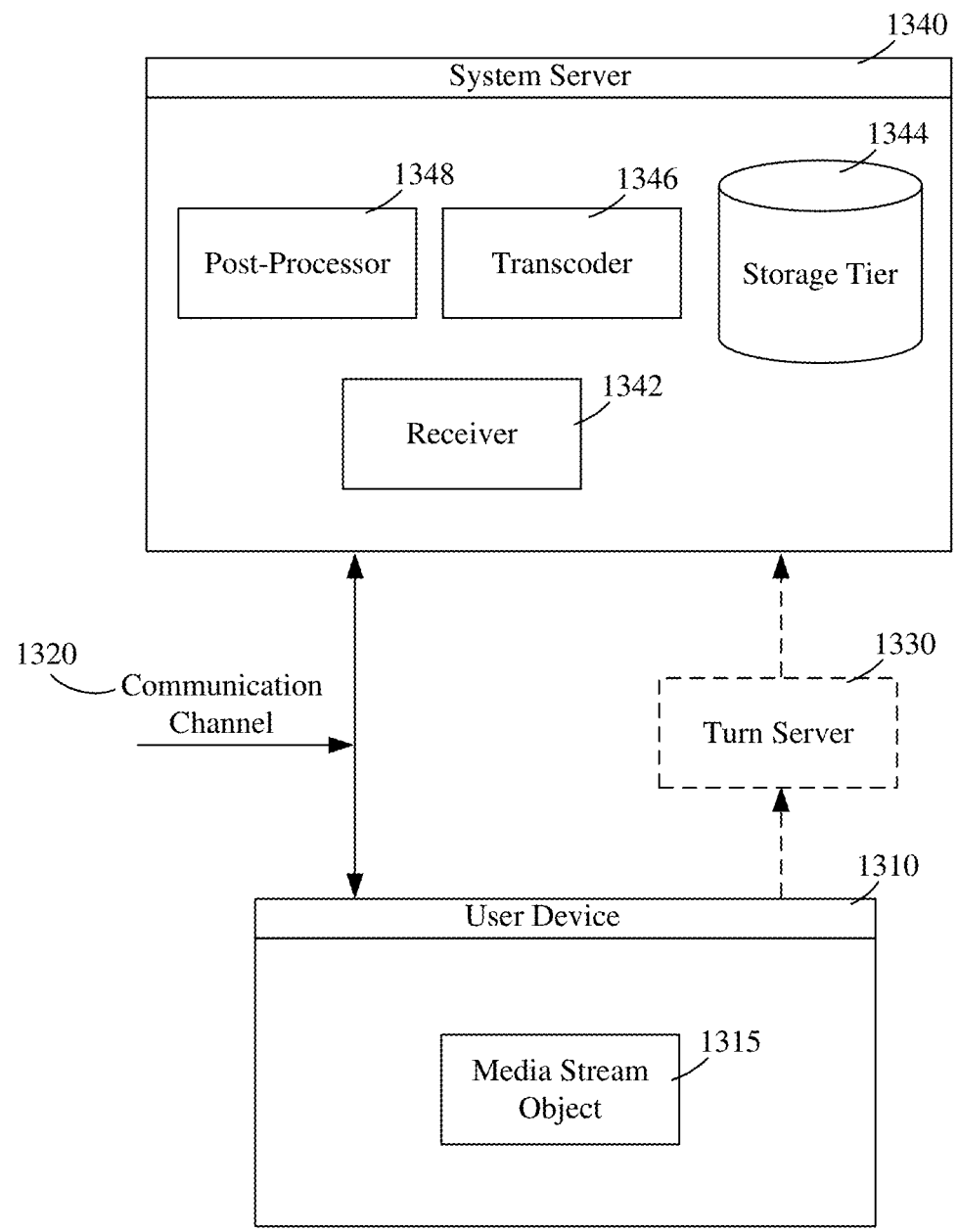
FIG. 13 is a block diagram illustrating data flow for curated media recording, according to one embodiment of the present invention.

More particularly, FIG. 13 shows a schematic block diagram illustrating data flow for curated media recordings, according to one embodiment of the present invention. A recording generated on a user device 1310 may include a combination of screen capture, front-facing camera capture, back-facing camera capture, and user annotations and dictations. Upon the start of a recording session, a screen display on the user device 1310, or any application running on the user device 1310 and displayed on the display screen, may be captured. A client application on the user device 1310 may then set up a media stream object 1315 on the user device containing the recording, and upload the media stream object to a system server 1340 through a communication channel 1320 established between the user device 1310 and the system server 1340. The communication channel 1320 may employ any lossless transmission protocols such as Web Socket, or any lossy and potentially real-time protocols such as WebRTC. In some embodiments, a TURN server 1330 may optionally be needed when a lossy transmission protocol such as WebRTC is used, if symmetry between the two ends of the communication channel cannot be achieved, as is further described in U.S. Pat. No. 9,641, 566. A receiver 1342 in the server 1340 receives the transmitted media stream object which contains media recording captured by the user device 1310. The received media recording may then be stored in a storage tier 1344, or be sent to a transcoder 1346. The received media recording may also be sent to a post-processor 1348 before or in parallel to the transcoding process. Post-processed data or transcoded data may then be stored through a storage tier 1344. In other words, the storage tier 1344 may store raw or post-processed media recordings in any format appropriate for media storage and/or sharing. For example, the storage tier 1344 may be a blob storage. In some embodiments, the storage tier 1344 may be a content delivery tier, and the system server 1340 may serve as a node within a content delivery network (CDN). In some other embodiments, the system server 1340 may be connected to a CDN, or a parallel storage that is connected to a CDN for redundancy. Connection to and interaction with a CDN allows for immediate sharing of the raw recording content as soon as the recording process is completed. As previously discussed, while the media stream object 1315 is transmitted through the communication channel 1320 to the system server 1340, the system server 1340 may optionally initiate a post-processing pipeline internally by sending the received media recordings to the post-processor 1348. Furthermore, a recording user may instruct through the user device 1310 whether recorded content may be shared immediately. Upon the receipt of a publication request for the recorded content as collected from or input by the user though the user device 1310, the system server 1340 may end a currently progressing post-processing pipeline before making post-processed media content available. For example, in response to receiving the publication request, the system server 1340 may make the received raw recording or post-processed recording accessible to one or more viewers within an immediate time frame, where the immediate time frame is a time to upload or receive a remaining number of bytes to the server, from the publication request time, plus a time to complete processing the remaining number of bytes to generate a complete video file for download by the one or more viewers at the server. In some embodiments, the system server 1340 may end the recording by continuing to receive the data recording upload until an end of file signal is detected, and start a new post-processing pipeline within the server to post-process the received recording. If immediate viewing of a raw, transcoded or post-processed media stream is desired, the previous step as discussed may be modified to stream raw data as received by the receiver 1342 to both the storage tier 1344 and/or the post-processing pipeline 1348 in parallel or in tandem. In other words, every process may be fully streamed, where media data is handled on a byte-by-byte, frame-by-frame, or segment by segment basis. As a post-processing pipeline is completed, post-processed recordings may be made accessible to one or more viewers. In some embodiments of the present invention, the post-processing pipeline may perform post-processing functions including, but not limited to, transcoding, audio extraction, video processing indexing, object detection, speech-to-text conversion, phoneme search, eye tracking, sentiment analysis, behavioral analysis, or gesture analysis. Thus, in some embodiments, the transcoder 1346 may be implemented as a particular instance of the post-processor 1348.

Figure 14:
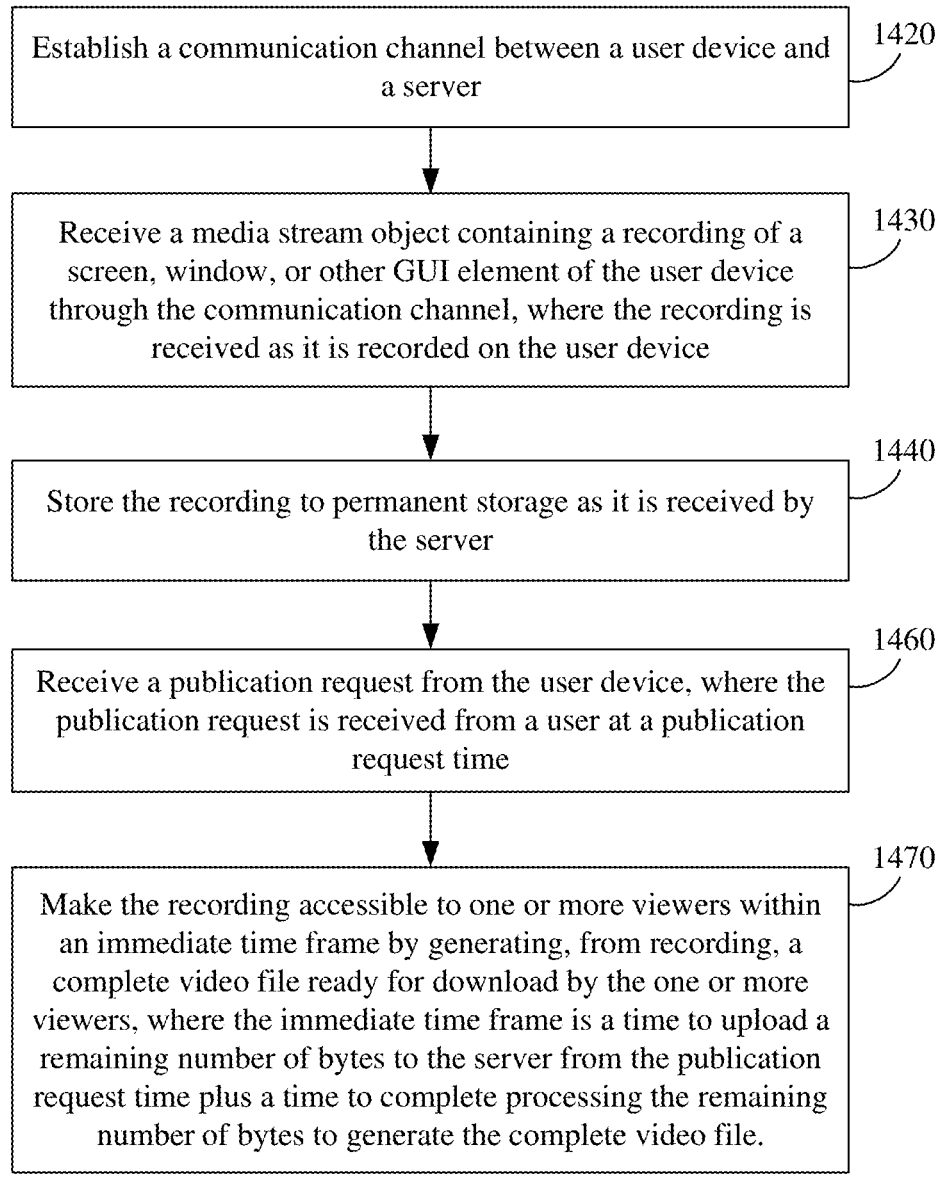
FIG. 14 is a flowchart illustrating a process for instantaneous asynchronous media sharing, according to one embodiment of the present invention.

FIG. 14 is a flowchart illustrating a process for instantaneous asynchronous media sharing, according to one embodiment of the present invention. Upon initiation, the system may establish a communication channel between a user device and a server at step 1420. Next, the system receives a media stream object containing a recording of a screen of the user device through the communication channel, where the recording is received as it is recorded on the user device, at step 1430. The system further stores the recording to permanent storage as the recording is received by the server at step 1440. The system server may optionally initiate a post-processing pipeline to post-process the received recording. Whether with or without a post-processing pipeline, the system receives a publication request from the user device, where the user request is received from a user through the user device at a publication request time at step 1460. In response to receiving the publication request, the recording is made accessible to one or more viewers within an immediate time frame, where the immediate time frame is a time to upload a remaining number of bytes to the server from the publication request time plus a time to complete processing the remaining number of bytes to generate a complete video file ready for download by the one or more viewers at the server at step 1470. In other words, the recording is made accessible to the viewers through the generation of the complete video file from the recording, where the complete video file is ready for download from the server by the one or more viewers. Such a generation process may simply involve completing the streamed upload of the recording and making it into a file entity, or may involve other post-processing steps as previously discussed.

While a recording is being made and uploaded, there may be different consumption patterns. In some embodiments, the consumption pattern is a live streaming from the recording user to the server, and through the server to the viewer, and the post-processing pipeline does not need to complete before the media is consumed. In some embodiments, the consumption pattern may be asynchronous video messaging, for which a subset of the post-processing pipeline must be finished or completed shortly or immediately after the publication request is received, in order for the post-processed recording to be made accessible. In some embodiments, the publication request is in the form of an end of transmission or end of file signal. In such cases, the post-processing process may be automatically completed upon the detection of such signals. In addition, in some embodiments, a viewer may have the same access as the uploading user to open-source or proprietary media container formats and players, such as a WebM-playable browser, where WebM is an open Media file format. The post-processing may then simply consist of uploading the video to a storage layer that backs it up to a CDN, and raw data may be consumed directly. In another example where a viewer's browser is not WebM-playable, the post-processing may include a transcoding step, where a final conversion to the MPEG-4 or MP4 media format is performed, and metadata such as defined through a metadata atom is constructed as part of the streamed transcoding process. Metadata atoms are discussed in more specific embodiments in U.S. Pat. No. 9,641,566. In both cases, the time-to-consumption, when bytes are uploaded as soon as they are recorded, is the time that it takes for the server to process the byte stream until the last byte is processed. The parallelism in recording, uploading, and streamed post-processing ensures that such time-to-consumption is very fast to seem almost instantaneous. Alternatively, if transmission speeds are lower than optimal, some down-sampling operations such as compressions may be performed on the recording data device first, and alternative communication protocols may be used, taking into account the quality of service desired, including but not limited to, error rate, throughput, and uplink and downlink transmission delays.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be in direct or indirect communication with, for example, one another over the same or different wired or wireless networks. Additionally, while FIGS. 15 and 16 illustrate the various system entities as separate, standalone entities, the various embodiments are not limited to this particular architecture.

Exemplary Management Computing Entity

Figure 15:
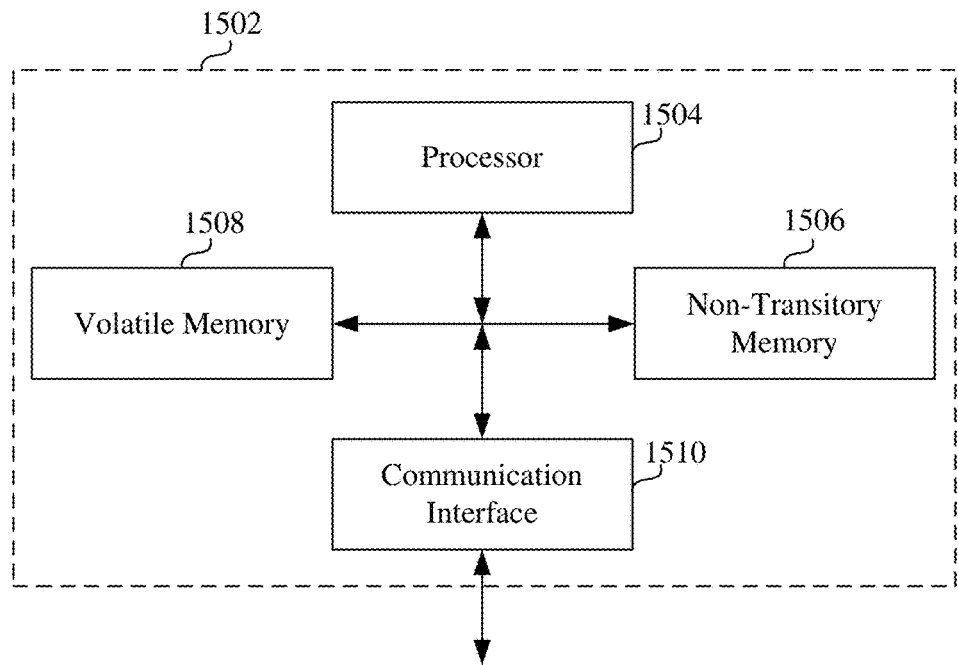
FIG. 15 provides a schematic of a server (management computing entity) for video recording of a window, according to one embodiment of the present invention.
Figure 16:
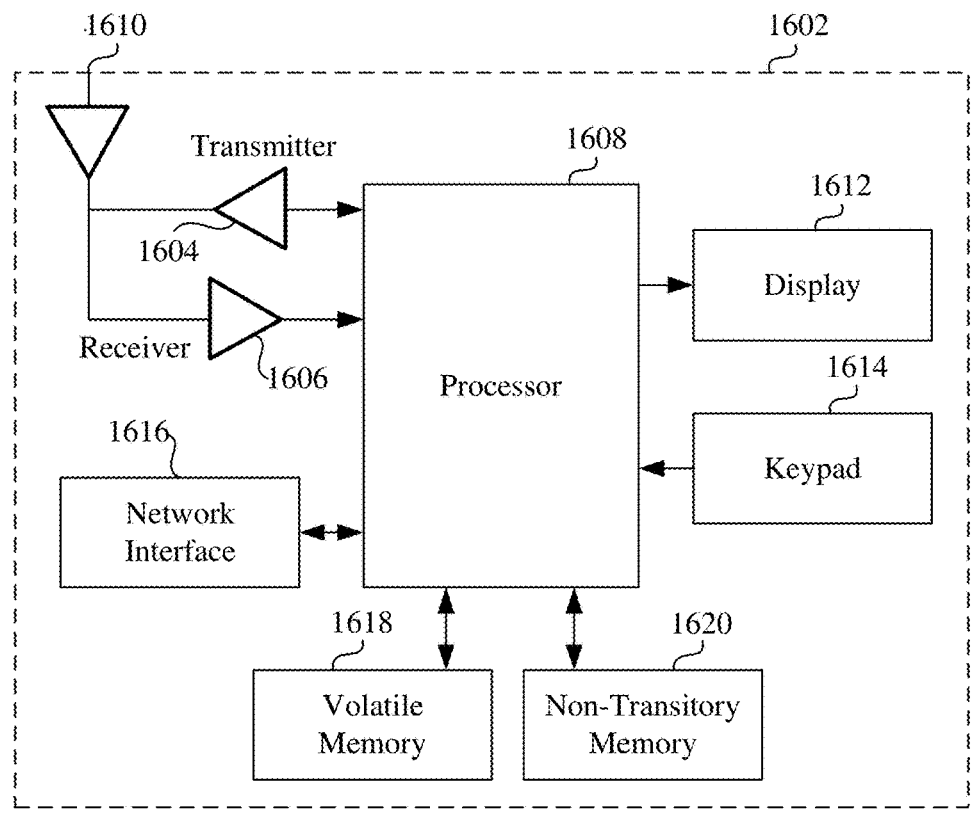
FIG. 16 provides an illustrative schematic representative of a client (user computing entity) that can be used in conjunction for video recording of a window, according to embodiments of the present invention.

FIG. 15 provides a schematic of a server (management computing entity, 1502) for video recording of a window, according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity (1502) may also include one or more communications interfaces (1510) for communicating with various computing entities, such as by communicating data, content, and/or information (similar terms used herein interchangeably) that can be transmitted, received, operated on, processed, displayed, stored, and/or the like.

As shown in FIG. 15, in one embodiment, the management computing entity (1502) may include or be in communication with one or more processors (i.e., processing elements, 1504, also referred to as processors and/or processing circuitry, and similar terms used herein interchangeably) that communicate with other elements within the management computing entity (1502) via a bus, for example. As will be understood, the processor (1504) may be embodied in a number of different ways. For example, the processor (1504) may be embodied as one or more complex programmable logic devices (CPLDs), microprocessors, multi-core processors, coprocessing entities, application-specific instruction-set processors (ASIPs), microcontrollers, and/or controllers. Further, the processor (1504) may be embodied as one or more other processing devices or circuitry. The term circuitry may refer to an entire hardware embodiment or a combination of hardware and computer program products. Thus, the processor (1504) may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processor (1504) may be configured for a particular use or configured to execute instructions stored in volatile or non-volatile (or non-transitory) media or otherwise accessible to the processor (1504). As such, whether configured by hardware or computer program products, or by a combination thereof, the processor (1504) may be capable of performing steps or operations according to embodiments of the present disclosure when configured accordingly.

In one embodiment, the management computing entity (1502) may further include or be in communication with non-transitory memory (also referred to as non-volatile media, non-volatile storage, non-transitory storage, memory, memory storage, and/or memory circuitry—similar terms used herein interchangeably). In one embodiment, the non-transitory memory or storage may include one or more non-transitory memory or storage media (1506), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity (1502) may further include or be in communication with volatile media (also referred to as volatile storage, memory, memory storage, memory and/or circuitry—similar terms used herein interchangeably). In one embodiment, the volatile storage or memory may also include one or more volatile storage or memory media 11208, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor (1504). Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity (1502) with the assistance of the processor (1504) and operating system.

As indicated, in one embodiment, the management computing entity (1502) may also include one or more communications interfaces (1510) for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity (11202) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity (1502) may include or be in communication with one or more input elements, such as a keyboard input, a mouse input, a touch screen/display input, motion input, movement input, audio input, pointing device input, joystick input, keypad input, and/or the like. The management computing entity (1502) may also include or be in communication with one or more output elements (not shown), such as audio output, video output, screen/display output, motion output, movement output, and/or the like.

As will be appreciated, one or more of the components of the management computing entity (1502) may be located remotely from other management computing entity (1502) components, such as in a distributed system. Furthermore, one or more of the components may be combined and additional components performing functions described herein may be included in the management computing entity (1502). Thus, the management computing entity (1502) can be adapted to accommodate a variety of needs and circumstances. As will be recognized, these architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 16 provides an illustrative schematic representative of a client (user computing entity, 1602) that can be used for video recording of a window, according to embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities (1602) can be operated by various parties. As shown in FIG. 16, the user computing entity (1602) can include an antenna (1610), a transmitter (1604) (e.g., radio), a receiver (1606) (e.g., radio), and a processor (i.e., processing element) (1608) (e.g., CPLDs, microprocessors, multi-core processors, coprocessing entities, ASIPs, microcontrollers, and/or controllers) that provides signals to and receives signals from the transmitter (1604) and receiver (1606), respectively.

The signals provided to and received from the transmitter (1604) and the receiver (1606), respectively, may include signaling information in accordance with air interface standards of applicable wireless systems. In this regard, the user computing entity (1602) may be capable of operating with one or more air interface standards, communication protocols, modulation types, and access types. More particularly, the user computing entity (1602) may operate in accordance with any of a number of wireless communication standards and protocols, such as those described above with regard to the management computing entity (1502). In a particular embodiment, the user computing entity (1602) may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity (1602) may operate in accordance with multiple wired communication standards and protocols, such as those described above with regard to the management computing entity (1502) via a network interface (1616).

Via these communication standards and protocols, the user computing entity (1602) can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity (1602) can also download changes, add-ons, and updates, for instance, to its firmware, software (e.g., including executable instructions, applications, program modules), and operating system.

According to one embodiment, the user computing entity (1602) may include location determining aspects, devices, modules, functionalities, and/or similar words used herein interchangeably. For example, the user computing entity (1602) may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's (1602) position in connection with a variety of other systems, including cellular towers, Wi-Fi access points, and/or the like. Similarly, the user computing entity (1602) may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity (1602) may also comprise a user interface (that can include a display (1612) coupled to a processor (1608) and/or a user input interface coupled to a processor (1608). For example, the user interface may be a user application, browser, user interface, and/or similar words used herein interchangeably executing on and/or accessible via the user computing entity (1602) to interact with and/or cause display of information from the management computing entity (1502), as described herein. The user input interface can comprise any of a number of devices or interfaces allowing the user computing entity (1602) to receive data, such as a keypad (1614) (hard or soft), a touch display, voice/speech or motion interfaces, or other input device. In embodiments including a keypad (1614), the keypad (1614) can include (or cause display of) the conventional numeric (0-9) and related keys (#, *), and other keys used for operating the user computing entity (1602) and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity (1602) can also include volatile storage or memory (1618) and/or non-transitory storage or memory (1620), which can be embedded and/or may be removable. For example, the non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory can store databases, database instances, database management systems, data, applications, programs, program modules, scripts, source code, object code, byte code, compiled code, interpreted code, machine code, executable instructions, and/or the like to implement the functions of the user computing entity (1602). As indicated, this may include a user application that is resident on the entity or accessible through a browser or other user interface for communicating with the management computing entity (1502) and/or various other computing entities.

In another embodiment, the user computing entity (1602) may include one or more components or functionality that are the same or similar to those of the management computing entity (1502), as described in greater detail above. As will be recognized, these architectures and descriptions are provided for exemplary purposes only and are not limiting to the various embodiments.

Exemplary Client Server Environment

Figure 17:
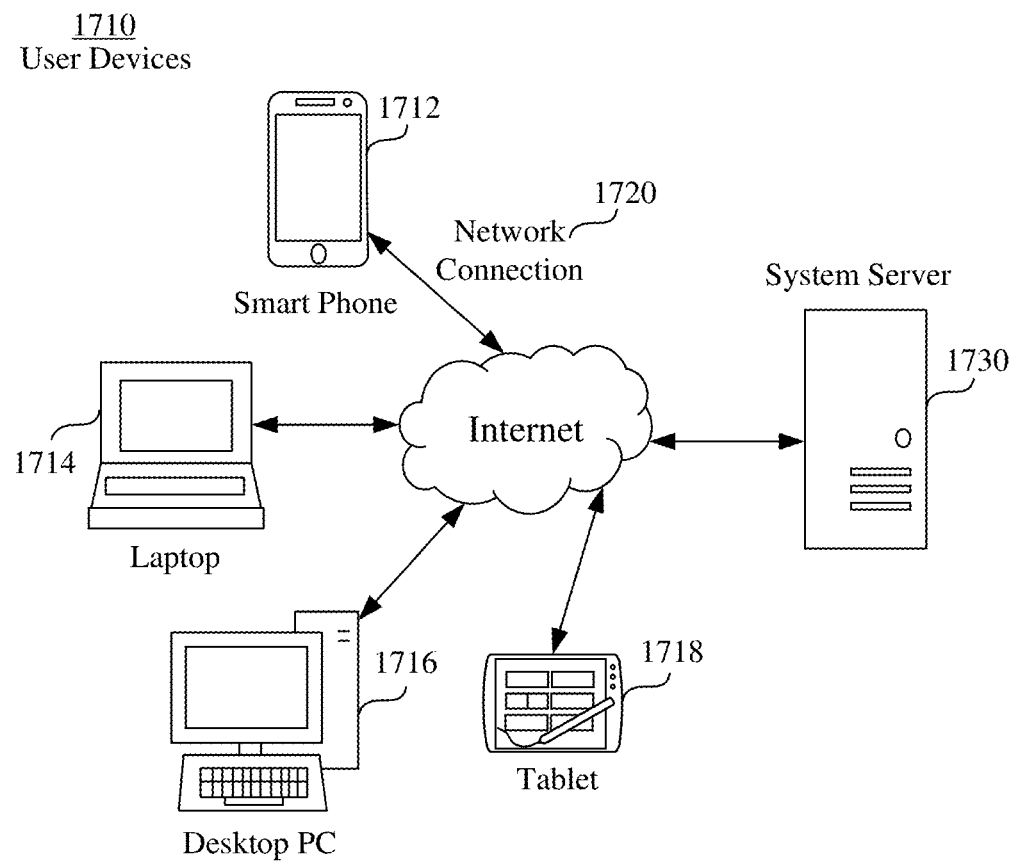
FIG. 17 shows an illustrative system architecture diagram for implementing video recording of a window in a client-server environment, according to one embodiment of the present invention.

The present invention may be implemented in a client server environment. FIG. 17 shows an illustrative system architecture for implementing video recording of a window in a client-server environment, according to one embodiment of the present invention. User devices (i.e., image-capturing device) (1710) on the client side may include smart phones (1712), laptops (1714), desktop PCs (1716), tablets (1718), or other devices. Such user devices (1710) access the service of the system server (1730) through some network connection (1720), such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module, or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every use case and application is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

What is claimed is:

1. A method for recording a Graphical User Interface (GUI) element on a user device, comprising:
   rendering a drag-to-record element on a display of the user device;
   receiving one or more parameters of the GUI element;
   determining one or more threshold edges of the GUI element based on the one or more parameters of the GUI element;
   receiving a drop position of the drag-to-record element above the GUI element, in response to a single action of dropping the drag-to-record element by a user above the GUI element, wherein the drop position of the drag-to-record element above the GUI element is bounded by the one or more threshold edges of the GUI element;
   identifying the GUI element as a recording target based on the drop position of the drag-to-record element in response to the single action of drooping the drag-to-record element by the user above the GUI element; and
   starting a video recording of a user interaction with the GUI element based on identifying the GUI element as the recording target in response to the single action of dropping the drag-to-record element by the user above the GUI element, wherein the video recording comprises a video of the user interaction with the GUI element.

2. The method of claim 1, further comprising:
   updating a current position of the drag-to-record element, in response to the user dragging the drag-to-record element on the display of the user device; and
   highlighting the GUI element as an indication of a possible selection of the GUI element, in response to the current position of the drag-to-record element being over the GUI element.

3. The method of claim 1, wherein the one or more parameters of the GUI element are selected from the group consisting of a dimension, a position, and one or more metadata of the GUI element.

4. The method of claim 3, wherein the one or more metadata of the GUI element comprises at least one of a GUI element name and a GUI element Universal Unique Identifier (UUID), wherein the dimension of the GUI element comprises a height and a width of the GUI element, and wherein the position of the GUI element is determined based upon one or more coordinates on the GUI.

5. The method of claim 1, wherein the one or more parameters of the GUI element are used to determine a size, a shape, and a position of the GUI element.

6. The method of claim 1, wherein the drag-to-record element is dragged by the user using one of a mouse down, mouse down and drag, a touch, and a drag option.

7. The method of claim 1, wherein rendering the drag-to-record element comprises rendering the drag-to-record element at a starting position on the display of the user device.

8. The method of claim 7, further comprising:
   returning the drag-to-record element to the starting position, and canceling the GUI element selection as the recording target, in response to the user performing an escape action.

9. The method of claim 8, wherein the escape action comprises pressing a predefined key of the user device.

10. The method of claim 7, further comprising:
    generating a selection GUI element in response to a dragging of the drag-to-record element by the user away from the starting position,
    wherein the selection GUI element comprises a representation of the GUI element, and
    wherein receiving the drop position of the drag-to-record element above the GUI element comprises receiving the drop position of the drag-to-record element above the representation of the GUI element in the selection GUI element.

11. The method of claim 1, further comprising:
    providing one or more recording control functions in response to identifying the GUI element as the recording target.

12. The method of claim 11, wherein the one or more recording control functions are selected from the group consisting of pause recording, delete recording, cancel recording, and start recording.

13. The method of claim 1, further comprising:
    sending a recorded GUI element stream to a server recording module in response to starting the video recording of the user interaction with the GUI element.

14. The method of claim 1, wherein the GUI element is selected from the group consisting of a window, a window header, a screen, a thumbnail, a representation icon, a start button, a menu, a menu item, a menu window representation, a dock, a dock item, a dock window representation, and an application icon.

15. The method of claim 1, wherein the receiving the drop position of the drag-to-record element is in response to the single action of dropping tithe drag-to-record element by the user above the GUI element and a simultaneous performing of a GUI element selection action by the user.

16. The method of claim 15, wherein the GUI element selection action comprises pressing a predefined key of the user device.

17. The method of claim 1, wherein the video recording further comprises a second video from a front-facing camera on the user device.

18. A non-transitory storage medium storing program code for recording a Graphical User Interface (GUI) element on a user device, the program code executable by a hardware processor, the program code when executed by the hardware processor causing the hardware processor to:
  render a drag-to-record element at a starting position on a display of the user device;
  receive one or more parameters of the GUI element;
  determine one or more threshold edges of the GUI element based on the one or more parameters of the GUI element;
  receive a drop position of the drag-to-record element above the GUI element, in response to a single action of dropping the drag-to-record element by a user above the GUI element, wherein the drop position of the drag-to-record element above the GUI element is bounded by the one or more threshold edges of the GUI element;
  identify the GUI element as a recording target based on the drop position of the drag-to-record element in response to the single action of dropping the drag-to-record element by the user above the GUI element; and
  start a video recording of a user interaction with the GUI element based on identifying the GUI element as the recording target in response to the single action of dropping the drag-to-record element by the user above the GUI element, wherein the video recording comprises a video of the user interaction with the GUI element.

19. The non-transitory storage medium of claim 18, further comprising program code to:
  update a current position of the drag-to-record element, in response to the user dragging the drag-to-record element on the display of the user device; and
  highlight the GUI element as an indication of a possible selection of the GUI element, in response to the current position of the drag-to-record element being over the GUI element.

20. The non-transitory storage medium of claim 18, further comprising program code to:
  generate a selection GUI element in response to a dragging of the drag-to-record element by the user away from the starting position,
  wherein the selection GUI element comprises a representation of the GUI element, and
  wherein the program code to receive the drop position of the drag-to-record element above the GUI element comprises program code to receive the drop position of the drag-to-record element above the representation of the GUI element in the selection GUI element.

21. The non-transitory storage medium of claim 18, wherein the program code to receive the drop position of the drag-to-record element is in response to the single action of dropping the drag-to-record element by the user above the GUI element and a simultaneous performing of a GUI element selection action by the user.

22. A method for recording a Graphical User Interface (GUI) element on a user device, comprising:
  rendering a drag-to-record element on a display of the user device;
  receiving one or more parameters of the drag-to-record element;
  determining one or more threshold edges of the drag-to-record element based on the one or more parameters of the drag-to-record element;
  receiving one or more parameters of the GUI element;
  receiving a drop position of the GUI element above the drag-to-record element, in response to a single action of dropping the GUI element by a user above the drag-to-record element, wherein the drop position of the GUI element above the drag-to-record element is bounded by the one or more threshold edges of the drag-to-record element;
  identifying the GUI element as a recording target based on the drop position of the GUI element in response to the single action of dropping the GUI element by the user above the drag-to-record element; and
  starting a video recording of a user interaction with the GUI element based on identifying the GUI element as the recording target in response to the single action of dropping the GUI element by the user above the drag-to-record element, using the one or more parameters of the GUI element, wherein the video recording comprises a video of the user interaction with the GUI element.

23. The method of claim 22, further comprising:
  updating a current position of the GUI element, in response to the user dragging the GUI element on the display of the user device; and
  highlighting one of the drag-to-record element and the GUI element as an indication of a possible selection of the GUI element, in response to the current position of the GUI element being over the drag-to-record element.

24. The method of claim 22,
  wherein the one or more parameters of the GUI element are selected from the group consisting of a dimension, a position, and one or more metadata of the GUI element,
  wherein the one or more metadata of the GUI element comprises at least one of a GUI element name and a GUI element Universal Unique Identifier (UUID),
  wherein the dimension of the GUI element comprises a height and a width of the GUI element, and
  wherein the position of the GUI element is determined based upon one or more coordinates on the GUI.

25. The method of claim 22,
  wherein the one or more parameters of the GUI element are used to determine a size, a shape, and an initial position of the GUI element, and
  wherein the one or more parameters of the drag-to-record element are used to determine a size, a shape, and a position of the drag-to-record element.

26. The method of claim 25, further comprising:
  returning the GUI element to the initial position of the GUI element, and canceling the GUI element selection as the recording target, in response to the user performing an escape action.

27. The method of claim 25, further comprising:
  returning the GUI element to the initial position of the GUI element; and providing one or more recording control functions in response to identifying the GUI element as the recording target.

28. The method of claim 22, further comprising:
sending a recorded GUI element stream to a server recording module in response to starting the video recording of the user interaction with the GUI element.

29. The method of claim 22, wherein the GUI element is selected from the group consisting of a window, a window header, a thumbnail, a screen thumbnail, a representation icon, a start button, a menu, a menu item, a menu window representation, a dock, a dock item, a dock window representation, and an application icon.

30. The method of claim 22, wherein the receiving the drop position of the GUI element is in response to the single action of dropping GUI element by the user above the drag-to-record element and a simultaneous performing of a GUI element selection action by the user.

* * * * *

UNITED STATES PATENT AND TRADEMARK OFFICE
CERTIFICATE OF CORRECTION

PATENT NO. : 11,755,192 B1
APPLICATION NO. : 17/958403
DATED : September 12, 2023
INVENTOR(S) : Thomas et al.

It is certified that error appears in the above-identified patent and that said Letters Patent is hereby corrected as shown below:

In the Claims

In Claim 1 (Column 31, Line 64), delete "of drooping" and replace with -- of dropping --.

In Claim 15 (Column 33, Line 6), delete "dropping tithe" and replace with -- dropping the --.

In Claim 30 (Column 35, Line 16), delete "dropping GUI" and replace with -- dropping the GUI --.

Signed and Sealed this
Thirteenth Day of August, 2024

Katherine Kelly Vidal
*Director of the United States Patent and Trademark Office*